United States Patent
Kim et al.

(10) Patent No.: US 12,008,198 B2
(45) Date of Patent: Jun. 11, 2024

(54) ELECTRONIC DEVICE INCLUDING ROLLABLE DISPLAY

(71) Applicant: Samsung Electronics Co., Ltd., Gyeonggi-do (KR)

(72) Inventors: Minuk Kim, Gyeonggi-do (KR); Sungho Ahn, Gyeonggi-do (KR); Bowon Jung, Gyeonggi-do (KR); Jihyung Jung, Gyeonggi-do (KR); Joungmin Cho, Gyeonggi-do (KR); Sungdae Choi, Gyeonggi-do (KR); Kwangtai Kim, Gyeonggi-do (KR); Donghyun Yeom, Gyeonggi-do (KR); Changryong Heo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 11 days.

(21) Appl. No.: 17/525,269

(22) Filed: Nov. 12, 2021

(65) Prior Publication Data

US 2022/0147179 A1     May 12, 2022

Related U.S. Application Data

(63) Continuation of application No. PCT/KR2021/016570, filed on Nov. 12, 2021.

(30) Foreign Application Priority Data

Nov. 12, 2020 (KR) .................. 10-2020-0150815
Jan. 6, 2021 (KR) .................. 10-2021-0001493

(51) Int. Cl.
    *G06F 3/041*     (2006.01)
    *G06F 1/16*     (2006.01)
    *G06F 3/044*     (2006.01)

(52) U.S. Cl.
    CPC .......... *G06F 3/0418* (2013.01); *G06F 1/1652* (2013.01); *G06F 3/0445* (2019.05);
(Continued)

(58) Field of Classification Search
None
See application file for complete search history.

(56) References Cited

U.S. PATENT DOCUMENTS

| | | |
|---|---|---|
| 2010/0117975 A1 | 5/2010 | Cho |
| 2014/0098075 A1 | 4/2014 | Kwak et al. |

(Continued)

FOREIGN PATENT DOCUMENTS

| | | |
|---|---|---|
| JP | 2015-041272 | 3/2015 |
| JP | 2018-060404 | 4/2018 |

(Continued)

OTHER PUBLICATIONS

International Search Report dated Feb. 14, 2022 issued in counterpart application No. PCT/KR2021/016570, 13 pages.

(Continued)

*Primary Examiner* — Nicholas J Lee
(74) *Attorney, Agent, or Firm* — The Farrell Law Firm, P.C.

(57) ABSTRACT

A method and an electronic device are provided for compensating for changed touch sensitivity of a touch panel of the electronic device. It is detected whether a rollable display of the electronic device is expanded. It is detected whether the touch sensitivity of the touch panel of the rollable display is changed, in case that the rollable display is expanded. A rolling direction and a length of extension of the rollable display is changed, in case that the touch sensitivity is changed. It is detected whether a resistance of an expansion area of the rollable display is changed. The (Continued)

touch sensitivity of the touch panel is compensated for, in case that the resistance is changed.

19 Claims, 12 Drawing Sheets

(52) U.S. Cl.
CPC .............. *G06F 2203/04102* (2013.01); *G06F 2203/04111* (2013.01); *G06F 2203/04112* (2013.01)

(56) References Cited

U.S. PATENT DOCUMENTS

| | | | |
|---|---|---|---|
| 2014/0218375 A1 | 8/2014 | Kim | |
| 2016/0216828 A1 | 7/2016 | Lee | |
| 2017/0372114 A1* | 12/2017 | Cho | .................. G06V 40/1318 |
| 2018/0032202 A1 | 2/2018 | Kim et al. | |
| 2018/0074585 A1 | 3/2018 | Levesque et al. | |
| 2018/0101276 A1 | 4/2018 | Hanari | |
| 2018/0196569 A1* | 7/2018 | Jun | ....................... G06F 3/0443 |
| 2018/0217715 A1 | 8/2018 | Cobanoglu et al. | |
| 2019/0354241 A1 | 11/2019 | Kim et al. | |
| 2019/0384438 A1 | 12/2019 | Park et al. | |
| 2020/0125817 A1 | 4/2020 | Kim et al. | |
| 2020/0285339 A1 | 9/2020 | Kim et al. | |
| 2020/0319735 A1 | 10/2020 | Kim et al. | |

FOREIGN PATENT DOCUMENTS

| | | |
|---|---|---|
| KR | 1020140044227 | 4/2014 |
| KR | 1020140046178 | 4/2014 |
| KR | 1020140100149 | 8/2014 |
| KR | 1020160092130 | 8/2016 |
| KR | 1020180000665 | 1/2018 |
| KR | 10-2019-0132600 | 11/2019 |
| KR | 1020190141518 | 12/2019 |
| KR | 1020200045844 | 5/2020 |
| KR | 1020200052725 | 5/2020 |
| KR | 1020200107019 | 9/2020 |

OTHER PUBLICATIONS

European Search Report dated Jan. 3, 2024 issued in counterpart application No. 21892375.3-1224, 9 pages.

* cited by examiner

ELECTRONIC DEVICE INCLUDING ROLLABLE DISPLAY

PRIORITY

This application is a bypass continuation of International Application No. PCT/KR2021/016570 designating the United States, and filed in the Korean Intellectual Property Receiving Office on Nov. 12, 2021, which claims priority to Korean Patent Application No. 10-2020-0150815, filed on Nov. 12, 2020, and Korean Patent Application No. 10-2021-0001493, filed on Jan. 6, 2021, in the Korean Intellectual Property Office, the disclosures of which are incorporated herein by reference in their entireties.

BACKGROUND

1. Field

The disclosure relates generally to an electronic device including a rollable display, and more particularly, to an electronic device and a method for compensating for touch sensitivity of the rollable display.

2. Description of Related Art

As the demand for mobile communication increases with the degree of integration of electronic devices, portability of electronic devices, such as mobile communication terminals, can be improved, and user convenience can be improved through the use various functions, such as multimedia functions. For example, by replacing a traditional mechanical (button-type) keypad with a display having an integrated touch screen function an electronic device can be miniaturized while maintaining the function of the input device. When the mechanical keypad is removed from an electronic device, the portability of the electronic device can be improved. When a display is expanded into an area from which the mechanical keypad is removed, an electronic device can provide a larger screen while maintaining the same size and weight.

In using a web surfing or multimedia function, it may be more convenient to use an electronic device having a larger screen. A larger display may be mounted on an electronic device in order to output a larger screen. However, there may be restrictions in increasing the size of the display when portability of the electronic device is considered. A display using an organic light-emitting diode may make it possible to ensure portability of an electronic device while providing a larger screen. For example, a display using an organic light-emitting diode (or an electronic device equipped with the display) may provide stable operation even if the display is very thin so that the display can be mounted on an electronic device in a foldable, bendable, or rollable form.

In an electronic device having a rollable display (hereinafter, referred to as a "rollable electronic device"), depending on the expanded or contracted length (or area) of the display, a user interface (UI) and a touch recognition range may be changed. The rollable electronic device may measure the expanded or contracted length of the display due to the rolling of the display. The rollable electronic device may output a screen corresponding to the expanded or contracted display.

A rollable electronic device may output a screen in a "basic state" in which an area visible to the outside of the display is minimized, and an in an "expanded state" in which at least a portion of the display is expanded compared to the basic state, according to an expansion or contraction operation of the display. In the basic state, the rear surface of the display is firmly supported by an internal structure or components of the electronic device. However, in the expanded state, the rear surface of the display may no longer be in the state of being supported by the internal structure or components of the electronic device.

When the rear surface of the display is not supported as described above, this may cause a bending or lifting phenomenon of a plurality of layer layers constituting the display. For example, an interlayer separation phenomenon may occur between at least one portion (e.g., a conductive layer) of a touch panel and another portion (e.g., an insulating layer) implemented in the display in order to implement a touch input. Accordingly, a change in capacitance value of the touch panel may occur, which may cause a problem in touch usability. In a rollable electronic device, a change in capacitance value of the touch panel may also occur due to physical vibration when the display is expanded or contracted, and thus, an issue regarding touch usability may occur.

SUMMARY

A method is provided for improving touch usability of a display by detecting the sensitivity of the touch panel associated with the bending or lifting of the display in an expanded state and correcting the sensitivity.

A rollable electronic device is provided that is improved in touch usability of a display by detecting the sensitivity of the touch panel associated with the bending or lifting of the display in an expanded state and correcting the sensitivity.

According to an aspect of the disclosure, a method is provided for compensating for changed touch sensitivity of a touch panel of an electronic device. It is detected whether a rollable display of the electronic device is expanded. It is detected whether the touch sensitivity of the touch panel of the rollable display is changed, in case that the rollable display is expanded. A rolling direction and a length of extension of the rollable display is changed, in case that the touch sensitivity is changed. It is detected whether a resistance of an expansion area of the rollable display is changed. The touch sensitivity of the touch panel is compensated for, in case that the resistance is changed.

According to an aspect of the disclosure, a rollable display including a touch panel is provided. The rollable display includes a first insulting layer, and an electrode layer disposed on the first insulating layer. The rollable display also includes a second insulating layer disposed under the first insulating layer, and at least one strain gauge sensor disposed on the first insulating layer. The rollable display further includes a first bridge for connection of the electrode layer, disposed on the second insulating layer. The electrode layer is connected to the first bride using a first via.

According to an aspect of the disclosure, a rollable display including a touch panel is provided. The rollable display includes a first insulting layer, and an electrode layer disposed on the first insulating layer and including a first electrode and a second electrode configured in a form of a metal mesh. The rollable display also includes a second insulating layer disposed under the first insulating layer, and at least one strain gauge sensor disposed in a dummy section of the first insulating layer. The rollable display further includes a first bridge for connection of the electrode layer, disposed on the second insulating layer, and a second bridge for connection of the at least one strain gauge sensor, disposed on the second insulating layer. The electrode layer is connected to the first bride using a first via. The at least one strain gauge sensor is connected to the second bridge using a second via.

A method and a rollable electronic device are provided for effectively detecting a change in touch sensitivity due to bending and lifting of a display.

According to various embodiments of the disclosure, a method and a rollable electronic device are provided for preventing touch malfunction by correcting a touch sensitivity changed according to bending and lifting of a display.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
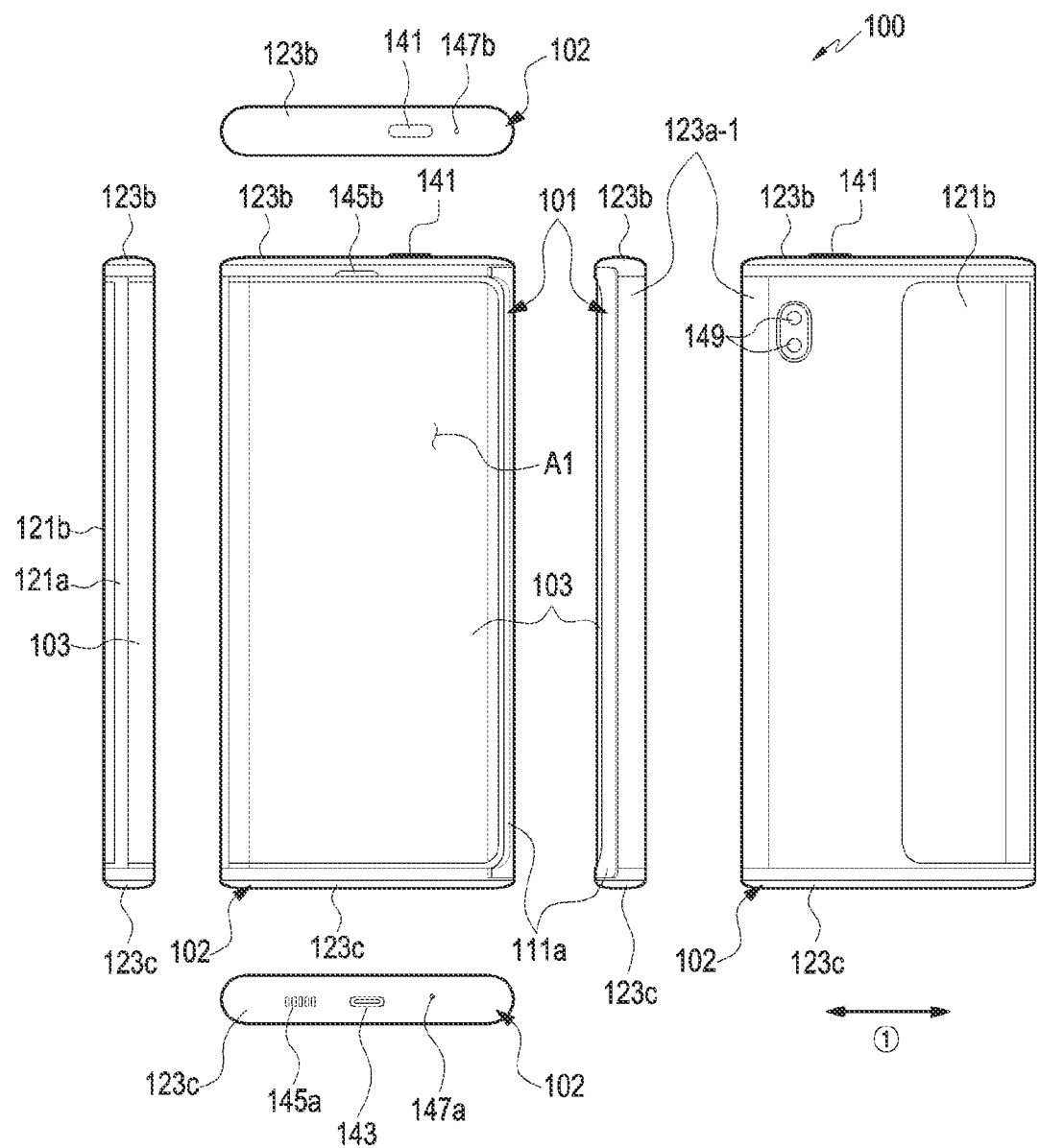
FIG. 1 is a diagram illustrating an electronic device in a state in which a portion of a flexible display is accommodated in a second structure, according to an embodiment.
Figure 2:
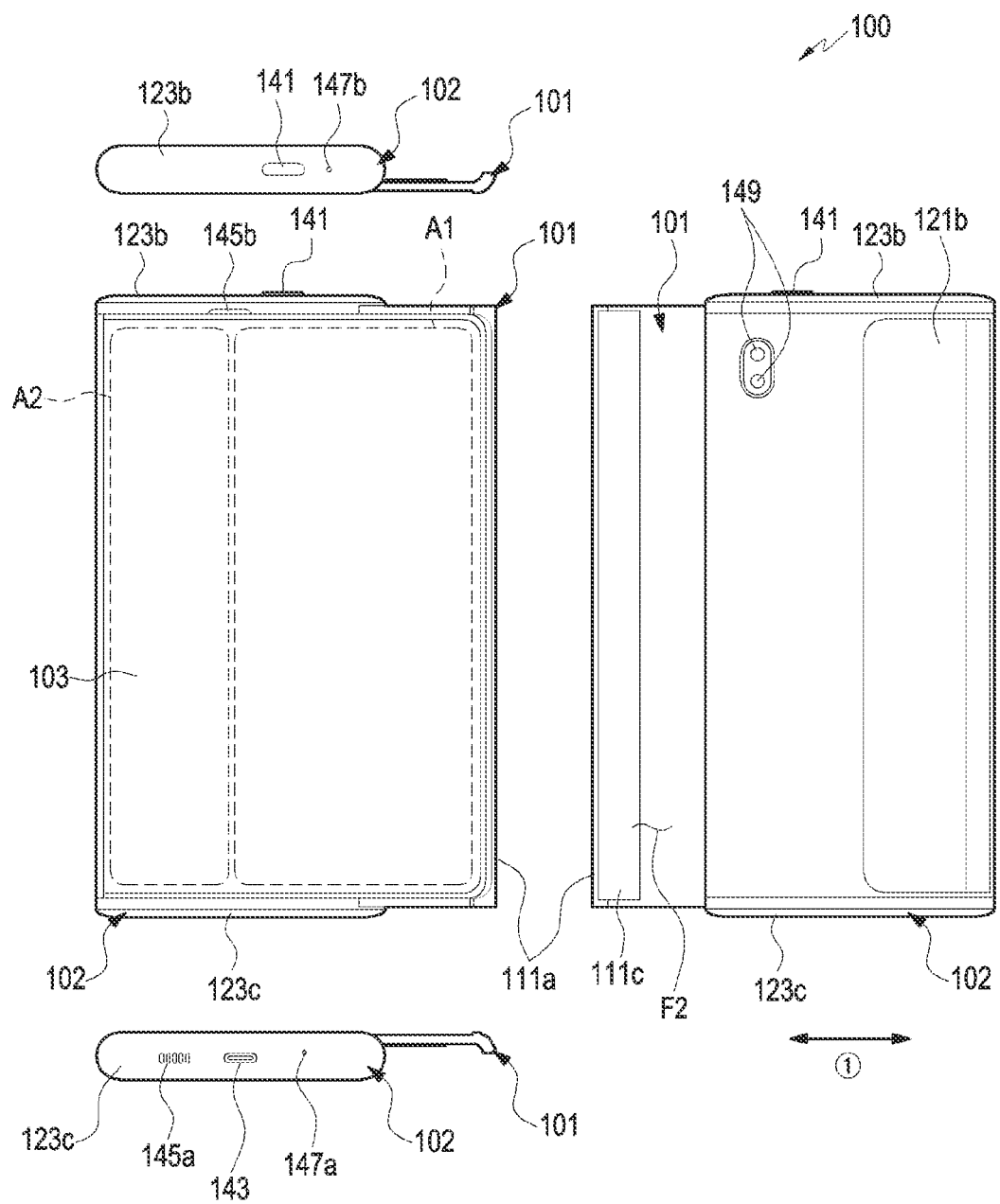
FIG. 2 is a diagram illustrating the electronic device in a state in which most of the flexible display is exposed to the outside of the second structure, according to an embodiment.

FIG. 1 is a diagram illustrating an electronic device in a state in which a portion of a flexible display is accommodated in a second structure, according to an embodiment. FIG. 2 is a diagram illustrating the electronic device in a state in which most of the flexible display is exposed to the outside of the second structure, according to an embodiment.

The state illustrated in FIG. 1 may be defined as the state in which a first structure 101 of an electronic device 100 is closed relative to a second structure 102. The state illustrated in FIG. 2 may be defined as the state in which the first structure 101 is opened relative to the second structure 102. The "closed state" and the "opened state" may be defined as the state in which the electronic device is closed and the state in which the electronic device is opened, respectively.

Referring to FIGS. 1 and 2, the electronic device 100 includes the first structure 101 and the second structure 102 disposed to be movable on the first structure 101. In some embodiments, the electronic device 100 may be interpreted as a structure in which the first structure 101 is disposed to be slidable on the second structure 102. According to an embodiment, the first structure 101 may be disposed to be reciprocable by a predetermined distance in the illustrated direction (e.g., the direction indicated by arrow ①) relative to the second structure 102.

According to various embodiments, the first structure 101 may be referred to as, for example, a first housing, a slide unit, or a slide housing, and may be disposed to be reciprocable on the second structure 102. In an embodiment, the second structure 102 may be referred to as, for example, a second housing, a main unit, or a main housing, and may accommodate various electrical and electronic components such as a main circuit board and a battery. A portion of the display 103 (e.g., the first area A1) may be seated on the first structure 101. In some embodiments, when the first structure 101 moves (e.g., slides) relative to the second structure 102, another portion of the display 103 (e.g., the second area A2) may be accommodated inside the second structure 102 (e.g., a slide-in operation) or exposed to the outside of the second structure 102 (e.g., a slide-out operation). Here, a portion of the display 103 (e.g., the first area A1) may be a basic use area when the display 103 is in the slide-in state, and another portion of the display 103 (e.g., the second area A2) may be an expansion area in the slide-out state. In the embodiment illustrated in FIGS. 1 to 3, an embodiment in which the basic use area of the display 103 in the slide-in state is seated on the first structure 101 is illustrated.

According to various embodiments, the first structure 101 may include a first plate 111a (e.g., a slide plate), and a first surface F1 (see FIG. 3) including at least a portion of the first plate 11a and a second surface F2 facing away from the first surface F1 may be included.

According to an embodiment, the second structure 102 may include a second plate 121a (see FIG. 3) (e.g., a rear case), a first side wall 123a extending from the second plate 121a, a second side wall 123b extending from the first side wall 123a and the second plate 121a, a third side wall 123c extending from the first side wall 123a and the second plate 121a and parallel to the second side wall 123b, and/or a rear plate 121b (e.g., a rear window). In some embodiments, the second side wall 123b and the third side wall 123c may be perpendicular to the first side wall 123a. According to an embodiment, the second plate 121a, the first side wall 123a, the second side wall 123b, and the third side wall 123c may be opened on one side (e.g., the front surface) to accommodate (or surround) at least a portion of the first structure 101. For example, the first structure 101 is coupled to the second structure 102 in a state of being at least partially surrounded and is slidable in a direction parallel to the first surface F1 (e.g., the front surface) or the second surface F2 (e.g., the rear surface), for example, in the direction indicated by arrow 1, while being guided by the second structure 102.

According to various embodiments, the second side wall 123b or the third side wall 123c may be omitted. According to an embodiment, the second plate 121a, the first side wall 123a, the second side wall 123b, and/or the third side wall 123c may be configured as separate structures and may be combined or assembled to each other. The rear plate 121b may be coupled to surround at least a portion of the second plate 121a. In some embodiments, the rear plate 121b may be substantially integrated with the second plate 121a. According to an embodiment, the second plate 121a or the rear plate 121b may cover at least a portion of the flexible display 103. For example, the flexible display 103 may be at least partially accommodated inside the second structure 102, and the second plate 121a or the rear plate 121b may cover a portion of the flexible display 103 accommodated inside the second structure 102.

According to various embodiments, the first structure 101 is movable to the opened state or the closed state relative to the second structure 102 in a first direction (e.g., direction ①) so that the first structure 101 is located at a first distance from the first side wall 123a in the closed state and at a second distance, which is greater than the first distance, from the first side wall 123a in the opened state. In some embodiments, in the closed state, the first structure 101 may be positioned to surround a portion of the first side wall 123a.

According to various embodiments, the electronic device 100 may include a display 103, a key input device 141, a connector hole 143, audio modules 145a, 145b, 147a, and 147b, and a camera module 149. Although not illustrated, the electronic device 100 may further include an indicator (e.g., an LED device) or various sensor modules.

According to various embodiments, the display 103 may include a first area A1 and a second area A2. In an embodiment, the first area A1 may extend substantially across at least a portion of the first surface F1 to be disposed on the first surface F1. The second area A2 extends from the first area A1, and may be inserted or accommodated into the second structure 102 (e.g., the main housing) or may be exposed to the outside of the second structure 102, according to the sliding movement of the first structure 101. As described in greater detail below, the second area A2 may be moved, while substantially being guided by a roller 151 (see FIG. 3) mounted on the second structure 102, to be accommodated inside the second structure 102 or exposed to the outside of the second structure 102. For example, while the first structure 101 slides, a portion of the second area A2 may be deformed into a curved shape at a position corresponding to the roller 151.

According to various embodiments, when viewed from above the first plate 111a (e.g., the slide plate), if the first structure 101 moves from the closed state to the opened state, the second area A2 may define a substantially flat surface with the first area A1 while being gradually exposed to the outside of the second structure 102. The display 103 may be coupled to or disposed adjacent to a touch detection circuit, a pressure sensor capable of measuring touch intensity (pressure), and/or a digitizer configured to detect a magnetic-field-type stylus pen. In an embodiment, the second area A2 may be at least partially accommodated inside the second structure 102, and a portion of the second area A2 may also be exposed to the outside of the second structure 102 even in the state illustrated in FIG. 1 (e.g., closed state). In some embodiments, irrespective of the closed state or the opened state, a portion of the exposed second area A2 may be located on the roller 151, and at a position corresponding to the roller 151, a portion of the second area A2 may maintain a curved shape.

The key input device 141 may be disposed on the second side wall 123b or the third side wall 123c of the second structure 102. The electronic device 100 may be designed such that, depending on the exterior and usage state, the illustrated key input devices 141 are omitted or one or more additional key input devices are included. In some embodiments, the electronic device 100 may include a key input device (not illustrated), such as a home key button or a touch pad disposed around the home key button. According to another embodiment, at least a portion of the key input device 141 may be located in an area of the first structure 101.

According to various embodiments, the connector hole 143 may be omitted according to an embodiment, and may accommodate a connector (e.g., a USB connector) for transmitting and receiving power and/or data to and from an external electronic device. Although not illustrated, the electronic device 100 may include a plurality of connector holes 143, and some of the connector holes 143 may function as connector holes for transmitting and receiving audio signals to and from an external electronic device. In the illustrated embodiment, the connector hole 143 is disposed in the third side wall 123c, but the disclosure is not limited thereto. The connector hole 143 or a connector hole (not illustrated) may be disposed in the first side wall 123a or the second side wall 123b.

According to various embodiments, the audio modules 145a, 145b, 147a, and 147b may include speaker holes 145a and 145b or microphone holes 147a and 147b. One of the speaker holes 145a and 145b may be provided as a receiver hole for a voice call, and another one may be provided as an external speaker hole. Each microphone hole 147a or 147b may include a microphone disposed therein so as to acquire external sound, and in some embodiments, may include a plurality of microphones disposed therein so as to detect the direction of sound. In some embodiments, the speaker holes 145a and 145b and the microphone holes 147a and 147b may be implemented as a single hole, or a speaker may be included without the speaker holes 145a and 145b (e.g., a piezo speaker). According to an embodiment, the speaker hole indicated by reference numeral "145b" may be disposed in the first structure 101 to be utilized as a receiver hole for a voice call, and the speaker hole (e.g., an external speaker hole) indicated by reference numeral "145a" or the microphone holes 147a and 147b may be disposed in the second structure 102 (e.g., one of the side surfaces 123a, 123b, and 123c).

The camera module 149 may be provided in the second structure 102 and may photograph a subject in a direction opposite to the first area A1 of the display 103. The electronic device 100 may include a plurality of camera modules 149. For example, the electronic device 100 may include a wide-angle camera, a telephoto camera, and/or a close-up camera. According to an embodiment, the electronic device 100 may measure a distance to a subject by including an infrared projector and/or an infrared receiver. The camera module 149 may include one or more lenses, an image sensor, and/or an image signal processor. Although not illustrated, the electronic device 100 may further include a camera module (e.g., a front camera) for photographing a subject in a direction opposite to the first area A1 of the display 103. For example, the front camera may be disposed around the first area A1 or in an area overlapping the display 103, and when disposed in the area overlapping the display 103, the front camera may photograph a subject through the display 103.

According to various embodiments, an indicator (not illustrated) of the electronic device 100 may be disposed on the first structure 101 or the second structure 102, and may provide state information of the electronic device 100 as a visual signal by including a light-emitting diode. A sensor module (not illustrated) of the electronic device 100 may generate an electrical signal or a data value corresponding to an internal operating state of the electronic device 100 or an external environmental state. The sensor module may include, for example, a proximity sensor, a fingerprint sensor, or a biometric sensor (e.g., an iris/face recognition sensor or a heart rate monitor (HRM) sensor). In another embodiment, the sensor module may further include at least one of, for example, a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor.

Figure 3:
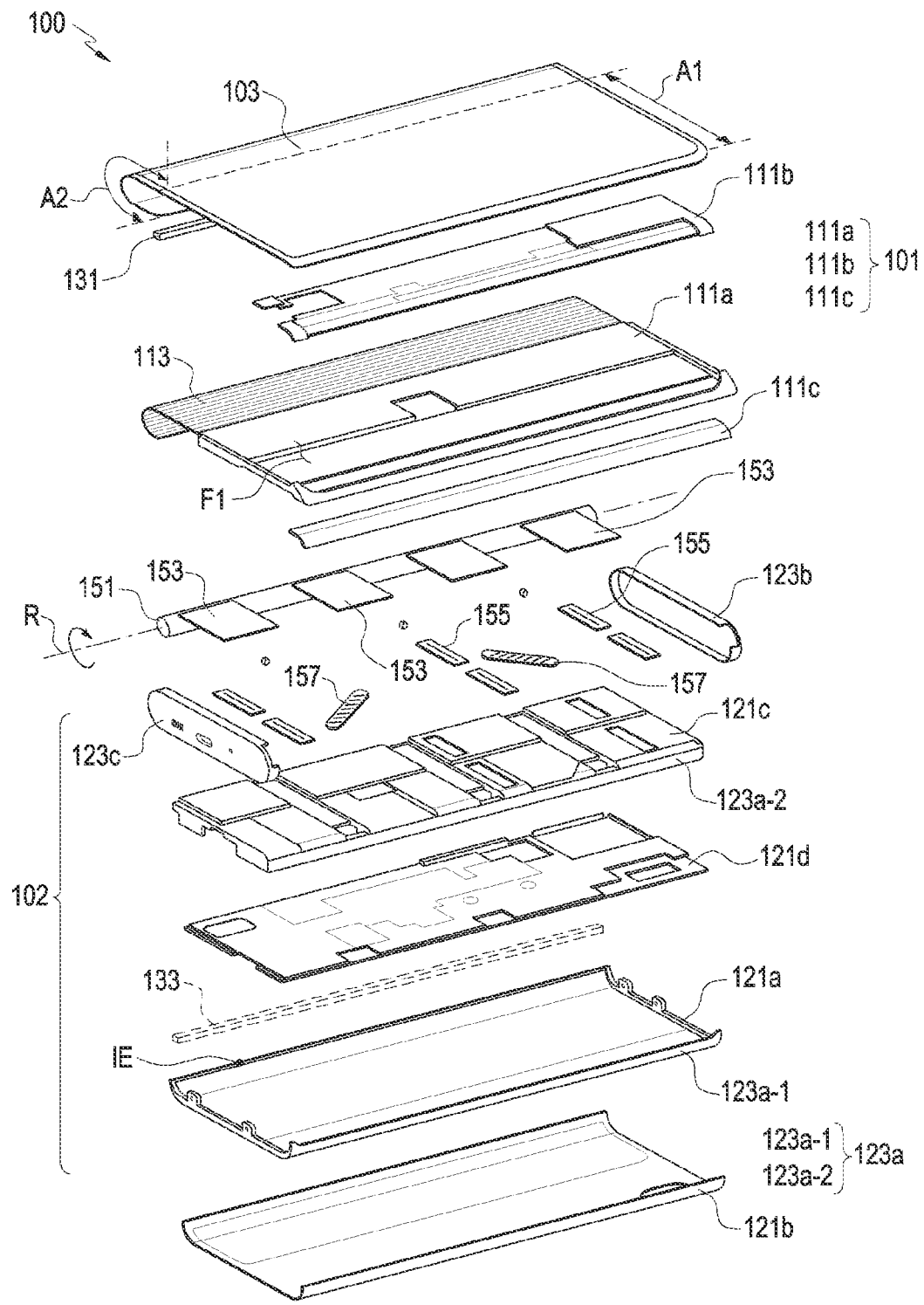
FIG. 3 is a diagram illustrating an exploded perspective view of the electronic device, according to an embodiment.

FIG. 3 is a diagram illustrating an exploded perspective view of an electronic device, according to an embodiment.

Referring to FIG. 3, the electronic device 100 includes the first structure 101, the second structure 102 (e.g., the main housing), the display 103 (e.g., the flexible display), a guide member (e.g., the roller 151), a support sheet 153, and/or an articulated hinge structure 113. A portion of the display 103 (e.g., the second area A2) may be accommodated inside the second structure 102 while being guided by the roller 151.

According to various embodiments, the first structure 101 may include a first plate 111a (e.g., a slide plate), and a first bracket 111b and/or a second bracket 111c, which are mounted on the first plate 111a. The first structure 101, for example, the first plate 111a, the first bracket 111b, and/or the second bracket 111c may be made of a metal material and/or a non-metal material (e.g., a polymer). The first plate 111a may be mounted on the second structure 102 (e.g., the main housing) to be linearly reciprocable in one direction (e.g., the direction indicated by arrow ① in FIG. 1) while being guided by the second structure 102. In an embodiment, the first bracket 111b may be coupled to the first plate 111a to define the first surface F1 of the first structure 101 together with the first plate 111a. The first area A1 of the display 103 may be substantially mounted on the first surface F1 to maintain a flat plate shape. The second bracket 111c may be coupled to the first plate 111a to define the second surface F2 of the first structure 101 together with the first plate 111a. According to an embodiment, the first bracket 111b and/or the second bracket 111c may be integrated with the first plate 111a. This may be appropriately designed in consideration of the assembly structure or manufacturing process of a manufactured product. The first structure 101 or the first plate 111a may be coupled to the second structure 102 to be slidable relative to the second structure 102.

According to various embodiments, the articulated hinge structure 113 may include a plurality of bars or rods (not illustrated) and may be connected to one end of the first structure 101. For example, as the first structure 101 slides, the articulated hinge structure 113 may move relative to the second structure 102, and in the closed state (e.g., the state illustrated in FIG. 1), the first structure 101 may be substantially accommodated inside the second structure 102. In some embodiments, even in the closed state, a portion of the articulated hinge structure 113 may not be accommodated inside the second structure 102. For example, even in the closed state, a portion of the articulated hinge structure 113 may be positioned to correspond to the roller 151 outside the second structure 102. The plurality of rods (not illustrated) may linearly extend to be disposed parallel to the rotation axis R of the roller 151, and may be arranged in a direction perpendicular to the rotation axis R, for example, the direction in which the first structure 101 slides.

Accordingly, as the first structure 101 slides, the plurality of rods (not illustrated) may be arranged to define a curved surface or a flat surface shape. For example, as the first structure 101 slides, the articulated hinge structure 113 may define a curved surface in a portion facing the roller 151, and the articulated hinge structure 113 may define a flat surface in a portion not facing the roller 151. In an embodiment, the second area A2 of the display 103 may be mounted or supported on the articulated hinge structure 113, and in the opened state (e.g., the state illustrated in FIG. 2), the second area A2 of the display 103 may be exposed to the outside of the second structure 102 together with the first area A1. In the state in which the second area A2 is exposed to the outside of the second structure 102, the articulated hinge structure 113 may support or maintain the second area A2 in the flat state by defining a substantially flat surface.

According to various embodiments, the second structure 102 (e.g., the main housing) may include a second plate 121a (e.g., a rear case), a printed circuit board (PCB)(not illustrated), the rear plate 121b, a third plate 121c (e.g., a front case), and a support member 121d. The second plate 121a (e.g., the rear case) may be disposed to face away from the first surface F1 of the first plate 111a and may substantially provide the external shape of the second structure 102 or the electronic device 100. In an embodiment, the second structure 102 may include a first side wall 123a extending from the second plate 121a, a second side wall 123b extending from the second plate 121a to be substantially perpendicular to the first side wall 123a, and a third side wall 123c extending from the second plate 121a to be substantially perpendicular to the first side wall 123a and parallel to the second side wall 123b. In the illustrated embodiment, a structure in which the second side wall 123b and the third side wall 123c are manufactured as parts separate from the second plate 121a and mounted on or assembled to the second plate 121a is illustrated. However, the second side wall 123b and the third side wall 123c may be manufactured integrally with the second plate 121a. The second structure 102 may accommodate an antenna for proximity wireless communication, an antenna for wireless charging, or an antenna for magnetic secure transmission (MST) in a space that does not overlap the articulated hinge structure 113.

According to various embodiments, the rear plate 121b may be coupled to the outer surface of the second plate 121a, and the rear plate 221b may be manufactured integrally with the second plate 121a according to an embodiment. In an embodiment, the second plate 121a may be made of a metal or polymer material, and the rear plate 121b may be made of a material such as metal, glass, synthetic resin, or ceramic to provide a decoration effect in the exterior of the electronic device 100. According to an embodiment, the second plate 121a and/or the rear plate 121b may be made of a material that transmits light through at least a portion (e.g., an auxiliary display area). For example, in the state in which a portion of the display 103 (e.g., the second area A2) is accommodated in the second structure 102, the electronic device 100 may output visual information using a partial area of the display 103 accommodated inside the second structure 102. The auxiliary display area may provide the visual information output from the area accommodated inside the second structure 102 to the outside of the second structure 102.

According to various embodiments, the third plate 121c may be made of a metal or polymer material and may be coupled to the second plate 121a (e.g., the rear case), the first side wall 123a, the second side wall 123b, and/or the third side wall 123c to define an internal space of the second structure 102. According to an embodiment, the third plate 121c may be referred to as a "front case", and the first structure 101 (e.g., the first plate 111a) may slide in the state of substantially facing the third plate 121c. In some embodiments, the first side wall 123a may be configured by a combination with a first side wall portion 123a-1 extending from the second plate 121a and a second side wall portion 123a-2 disposed at a side edge of the third plate 121c. In another embodiment, the first side wall portion 123a-1 may be coupled to surround one side edge of the third plate 121c (e.g., the second side wall portion 123a-2), and in this case, the first side wall portion 123a-1 itself may be the first side wall 123a.

According to various embodiments, the support member 121d may be disposed in a space between the second plate 121a and the third plate 121c and may have a flat plate shape made of a metal or polymer material. The support member 121d may provide an electromagnetic shielding structure in the internal space of the second structure 102 or may improve mechanical rigidity of the second structure 102. In an embodiment, when received inside the second structure 102, the articulated hinge structure 113 and/or a partial area (e.g., the second area A2) of the display 103 may be located in a space between the second plate 121a and the support member 121d.

According to various embodiments, a printed circuit board (not illustrated) may be disposed in a space between the third plate 121c and the support member 121d. For example, the printed circuit board may be accommodated in a space separated, by the support member 121d, from a space in which the articulated hinge structure 113 and/or a partial area of the display 103 is accommodated inside the second structure 102. On the printed circuit board, a processor, a memory, and/or an interface may be mounted. The processor may include one or more of, for example, a central processing unit, an application processor, a graphics processor, an image signal processor, a sensor hub processor, or a communication processor.

The memory may include, for example, a volatile memory and/or a nonvolatile memory.

The interface may include, for example, a high-definition multimedia interface (HDMI), a universal serial bus (USB) interface, an SD card interface, and/or an audio interface. The interface may electrically or physically connect, for example, the electronic device 100 to an external electronic device and may include a USB connector, an SD card/an MMC connector, or an audio connector.

The display 103 is a flexible display based on an organic light-emitting diode and is at least partially deformable into a curved shape while being generally maintained in a flat shape. The first area A1 of the display 103 may be mounted on or attached to the first surface F1 of the first structure 101 to maintain a substantially flat plate shape. The second area A2 extends from the first area A1 and may be supported on or attached to the articulated hinge structure 113. For example, the second area A2 may extend along the sliding movement direction of the first structure 101, may be accommodated inside the second structure 102 together with the articulated hinge structure 113, and may be deformed in an at least partially curved shape according to the deformation of the articulated hinge structure 113.

As the first structure 101 slides on the second structure 102, the area of the display 103 exposed to the outside may vary. The electronic device 100 (e.g., a processor) may change the area of the display 103 that is activated based on the area of the display 103 exposed to the outside. For example, in the opened state or at a position intermediate (intermediate state) between the closed state and the opened state, the electronic device 100 may activate the area exposed to the outside of the second structure 102 in the total area of the display 103. In the closed state, the electronic device 100 may activate the first area A1 of the display 103 and deactivate the second area A2 of the display 103. In the closed state, when there is no user input for a predetermined period of time (e.g., 30 seconds or 2 minutes), the electronic device 100 may deactivate the entire area of the display 103. In some embodiments, in the state in which the entire area of the display 103 is deactivated, the electronic device 100 may provide visual information through an auxiliary display area (e.g., a portion of the second plate 121a and/or the rear plate 121b made of a material that transmits light) by activating a partial area of the display 103 as needed (e.g., providing a notification or a missed call/message arrival notification according to a user setting).

According to various embodiments, in the opened state (e.g., the state illustrated in FIG. 2), substantially the entire area (e.g., the first area A1 and the second area A2) of the display 103 may be exposed to the outside, and the first area A1 and the second area A2 may be disposed to define a plane. In an embodiment, even in the opened state, a portion (e.g., an end) of the second area A2 may be located to correspond to the roller 151, and the portion corresponding to the roller 151 in the second area A2 may be maintained in a curved shape. For example, in various embodiments disclosed herein, even if it is stated that "in the opened state, the second area A2 is disposed to define a plane", a portion of the second area A2 may be maintained in a curved shape. Similarly, although it is stated that "in the closed state, the articulated hinge structure 113 and/or the second area A2 are accommodated in the second structure 102", a portion of the articulated hinge structure 113 and/or the second area A2 may be located outside the second structure 102.

According to various embodiments, a guide member (e.g., the roller 151) may be rotatably mounted on the second structure 102 at a position adjacent to one side edge of the second structure 102 (e.g., the second plate 121a). For example, the roller 151 may be disposed adjacent to the edge of the second plate 121a parallel to the first side wall 123a (e.g., the portion indicated by reference numeral "IE"). Although reference numerals are not given in the drawings, another side wall may extend from an edge of the second plate 121a adjacent to the roller 151, and the side wall adjacent to the roller 151 may be substantially parallel to the first side wall 123a. As mentioned above, the side wall of the second structure 102 adjacent to the roller 151 may be made of a material that transmits light, and a portion of the second area A2 may provide visual information through a portion of the second structure 102 in the state of being accommodated in the second structure 102.

According to various embodiments, one end of the roller 151 may be rotatably coupled to the second side wall 123b, and the other end may be rotatably coupled to the third side wall 123c. For example, the roller 151 may be mounted on the second structure 102 to be rotatable about a rotation axis R perpendicular to the slide direction of the first structure 101 (e.g., the direction indicated by arrow ① in FIG. 1 or FIG. 2). The rotation axis R may be disposed substantially parallel to the first side wall 123a, and may be located, for example, at one edge of the second plate 121a far from the first side wall 123a. In an embodiment, the spacing provided between the outer circumferential surface of the roller 151 and the inner surface of the edge of the second plate 121a may define an inlet through which the articulated hinge structure 113 or the display 103 enters the inside of the second structure 102.

According to various embodiments, when the display 103 is deformed into a curved shape, the roller 151 is able to suppress excessive deformation of the display by maintaining the radius of curvature of the display 103 to a certain degree. "Excessive deformation" may mean that the display 103 is deformed to have an excessively small radius of curvature to the extent that pixels or signal wires included in the display 103 are damaged. For example, the display 103 may be moved or deformed while being guided by the roller 151 and may be protected from damage due to excessive deformation. In some embodiments, the roller 151 may rotate while the articulated hinge structure 113 or the display 103 is inserted into or extracted from the second structure 102. For example, by suppressing friction between the articulated hinge structure 113 (or the display 103) and the second structure 102, the articulated hinge structure 113 (or the display 103) is able to smoothly perform the insertion/extraction operation of the second structure 102.

According to various embodiments, the support sheet 153 may be made of a flexible and somewhat elastic material, for example, a material including an elastic body such as silicone or rubber. The support sheet 153 may be mounted on or attached to the roller 151 and may be selectively wound around the roller 151 as the roller 151 rotates. As shown in FIG. 3, a plurality of (e.g., four) support sheets 153 may be arranged along the direction of the rotation axis R of the roller 151. For example, the plurality of support sheets 153 may be mounted on the roller 151 such that adjacent support sheets 153 are spaced apart from each other by a predetermined interval, and may extend in a direction perpendicular to the rotation axis R. In another embodiment, one support sheet may be mounted on or attached to the roller 151. For example, one support sheet may have a size and shape corresponding to the area in which the support sheets 153 are disposed and the areas between the support sheets 153 in FIG. 3. In this way, the number, size, or shape of the support sheets 153 may be appropriately changed depending on an actually manufactured product. In some embodiments, the support sheet 153 may be rolled on the outer circumferential surface of the roller 151 as the roller 151 rotates or may be spread out from the roller 151 in a flat plate shape from the space between the display 103 and the third plate 121c. In another embodiment, the support sheet 153 may be referred to as a "support belt", an "auxiliary belt", a "support film", or an "auxiliary film".

According to various embodiments, an end of the support sheet 153 may be connected to the first structure 101 (e.g., the first plate 111a (e.g., a slide plate)), and the support sheet 153 may be rolled on the roller 151 in the closed state (e.g., the state illustrated in FIG. 1). Accordingly, when the first plate 111a moves to the opened state (e.g., the state illustrated in FIG. 2), the support sheet 153 may be gradually located between the second structure 102 (e.g., the third plate 121c) and the display 103 (e.g., the second area A2) or between the second structure 102 (e.g., the third plate 121c) and the articulated hinge structure 113. For example, at least a portion of the support sheet 153 may be located to face the articulated hinge structure 113, and may be selectively wound around the roller 151 according to the sliding movement of the first plate 111a. The support sheet 153 may be generally disposed to be in contact with the articulated hinge structure 113, but a portion rolled on the roller 151 may be substantially separated from the articulated hinge structure 113.

According to various embodiments, an arrangement spacing between the surface of the display 103 and the inner surface of the edge of the second plate 121a may be different depending on the extent to which the support sheet 153 is wound around the roller 151. The smaller the arrangement spacing, the easier it is to prevent introduction of foreign matter. However, when the arrangement spacing is excessively small, the display 103 may come into contact with or rub against the second plate 121a. When direct contact or rubbing occurs, the surface of the display 103 may be damaged or the sliding operation of the first structure 101 may be hindered.

According to various embodiments, in the closed state, since the support sheet 153 is wound around the roller 151, it is possible to reduce the spacing between the surface of the display 103 and the inner surface of the edge of the second plate 121a while maintaining the state in which the surface of the display 103 is not in contact with the second plate 121a. For example, by reducing the arrangement spacing in the closed state, it is possible to block the introduction of external foreign matter into the inside of the second structure 102. In an embodiment, as the first structure 101 (e.g., the first plate 111a or the slide plate) gradually moves to the opened state, the support sheet 153 may move away from the roller 151 to gradually move to the space between the second structure 102 (e.g., the second plate 121a or the third plate 121c) and the articulated hinge structure 113. For example, as the first structure 101 moves to the opened state, the arrangement spacing gradually increases so that it is possible to suppress direct friction or contact between the display 103 and another structure (e.g., the second plate 121a) and to prevent the surface of the display 103 from being damaged due to the friction or contact. In some embodiments, the thickness of the support sheet 153 may gradually increase from one end (e.g., the portion fixed to the roller 151) toward the other end (e.g., the portion fixed to the first plate 111a). By using the thickness profile of the support sheet 153, it is possible to adjust the arrangement spacing in the closed state and the opened state.

The electronic device 100 may include at least one elastic member 131 or 133 made of a low-density elastic body, such as a sponge, or a brush. For example, the electronic device 100 may include a first elastic member 131 mounted on one end of the display 103, and may further include a second elastic member 133 mounted on the inner surface of an edge of the second plate 121a. The first elastic member 131 may be substantially disposed in the internal space of the second structure 102, and in the opened state (e.g., the state illustrated in FIG. 2), the first elastic member 131 may be located to correspond to the edge of the second plate 121a. In an embodiment, the first elastic member 131 may move in the internal space of the second structure 102 according to the sliding movement of the first structure 101. When the first structure 101 moves from the closed state to the opened state, the first elastic member 131 may move toward the edge of the second plate 121a. When the first structure 101 reaches the opened state, the first elastic member 131 may come into contact with the inner surface of the edge of the second plate 121a. For example, in the opened state, the first elastic member 131 may seal the spacing between the inner surface of the edge of the second plate 121a and the surface of the display 103. In another embodiment, when moving from the closed state to the opened state, the first elastic member 131 may move while being in contact with the second plate 121a (e.g., slide contact). For example, when foreign matter is introduced into the spacing between the second area A2 and the second plate 121a in the closed state, the first elastic member 131 may discharge the foreign matter to the outside of the second structure 102 while moving to the opened state.

According to various embodiments, the second elastic member 133 may be attached to the inner surface at the edge of the second plate 121a and may be disposed to substantially face the inner surface of the display 103. In the closed state, the spacing (e.g., the arrangement spacing) between the surface of the display 103 and the inner surface of the edge of the second plate 121a may be substantially determined by the second elastic member 133. According to an embodiment, in the closed state, the second elastic member 133 may substantially seal the arrangement spacing by coming into contact with the surface of the display 103. According to an embodiment, the second elastic member 133 may be made of a low-density elastic body, such as a sponge, or a brush, so that the surface of the display 103 can be prevented from being damaged even if the second elastic member 133 comes into direct contact with the display 103. In another embodiment, the arrangement spacing may increase as the first structure 101 gradually moves to the opened state. For example, the second area A2 of the display 103 may be gradually exposed to the outside of the second structure 102 without substantially coming into contact with or rubbing against the second elastic member 133. When the first structure 101 reaches the opened state, the first elastic member 131 may come into contact with the second elastic member 133. For example, in the opened state, the first elastic member 131 and the second elastic member 133 may block the introduction of foreign matter by sealing the arrangement spacing.

According to various embodiments, the electronic device 100 may further include a guide rail(s) 155 and/or an actuating member(s) 157. The guide rail(s) 155 may be mounted on the second structure 102 (e.g., the third plate 121c) to guide the sliding movement of the first structure 101 (e.g., the first plate 111a or slide plate). The actuating member(s) 157 may include a spring or a spring module that provides an elastic force in a direction to move opposite ends thereof away from each other. One end of the actuating member(s) 157 may be rotatably supported by the second structure 102, and the other end(s) may be rotatably supported by the first structure 101. When the first structure 101 slides, the opposite ends of the actuating member(s) 157 may be located closest to each other at any one point between the closed state and the opened state (hereinafter, referred to as the "closest point"). For example, in the section between the closest point and the closed state, the actuating member(s) 157 may provide an elastic force to the first structure 101 in a direction to move toward the closed state and in the section between the closest point and the opened state, the actuating member(s) 157 may provide an elastic force to the first structure 101 in a direction to move toward the opened state.

As set forth below, components, which can be easily understood through the preceding description, may be denoted by the same reference numerals or the reference numerals may be omitted, and the detailed description thereof may also be omitted. An electronic device (e.g., the electronic device 100 in FIGS. 1 to 3) according to various embodiments disclosed herein may be implemented by selectively combining configurations of different embodiments, and the configuration of one embodiment may be replaced by that of another embodiment. For example, it is noted that the disclosure is not limited to specific figures or embodiments.

Figure 4:
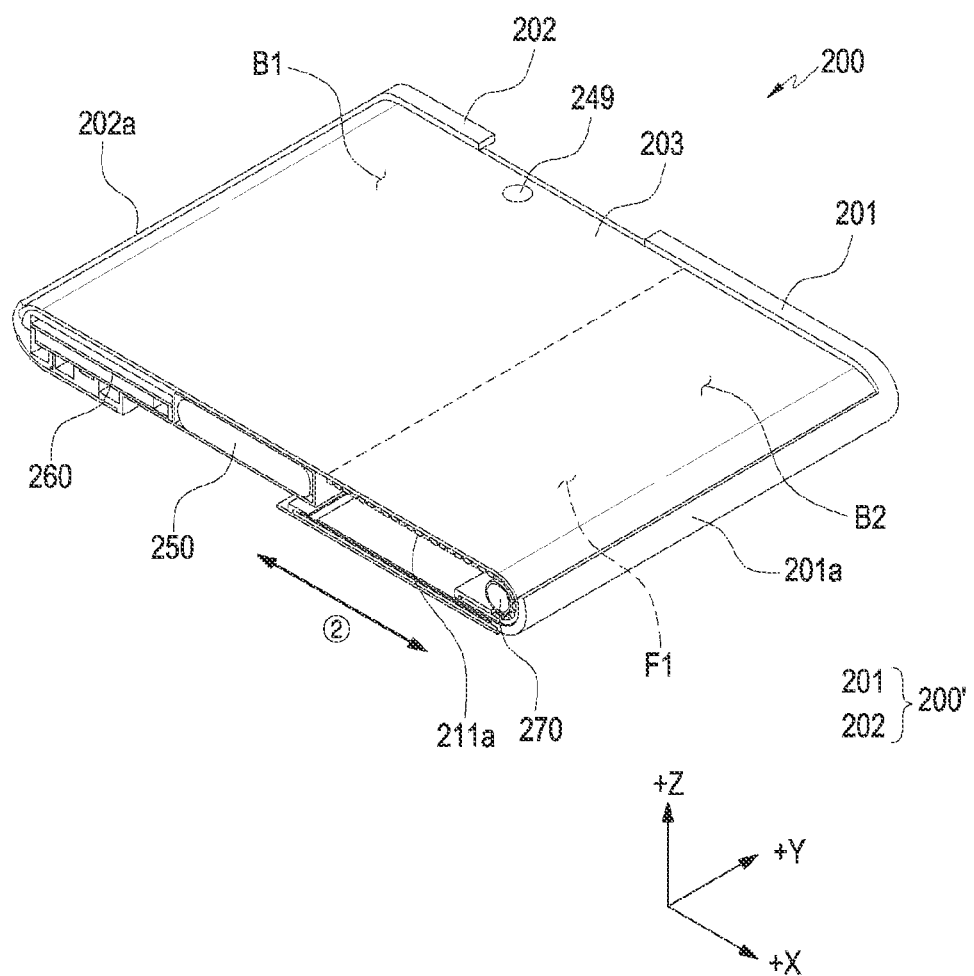
FIG. 4 is a diagram illustrating an exploded perspective view of a flexible display mounting structure of an electronic device, according to an embodiment.

FIG. 4 is a diagram illustrating a perspective view of an electronic device, according to an embodiment.

In FIG. 4 and subsequent figures, a spatial coordinate system defined by the X axis, the Y axis, and the Z axis orthogonal to each other is illustrated. The X axis represents a width direction of the electronic device, the Y axis represents a longitudinal direction of the electronic device, and the Z axis represents a height (or thickness) direction of the electronic device. In the following description, the Z axis may correspond to the direction in which a plurality of layers constituting a display 203 are laminated.

Referring to FIG. 4, the electronic device 200 may include a first structure 201 and a second structure 202 disposed to be movable on the first structure 201. In some embodiments, the electronic device 200 may be interpreted as a structure in which the first structure 201 is disposed to be slidable on the second structure 202. According to an embodiment, the first structure 201 may be disposed to be reciprocable by a predetermined distance in the illustrated direction (e.g., the direction indicated by arrow ②) relative to the second structure 202.

According to various embodiments, the first structure 201 may be referred to as, for example, a first housing, a slide unit, or a slide housing, and may be disposed to be reciprocable on the second structure 202. In an embodiment, the second structure 202 may be referred to as, for example, a second housing, a main unit, or a main housing, and may accommodate various electrical and electronic components, such as a main circuit board and a battery. A portion of the display 203 (e.g., a first area B1) may be seated on the second structure 202. In some embodiments, when the first structure 201 moves (e.g., slides) relative to the second structure 202, another portion of the display 203 (e.g., a second area B2) may be accommodated inside the second structure 202 (e.g., a slide-in operation) or exposed to the outside of the second structure 202 (e.g., a slide-out operation). Here, a portion of the display 203 (e.g., the first area B1) may be a basic use area (or a non-expansion area) when the display 203 is in the slide-in state, and another portion of the display 203 (e.g., the second area B2) may be an expansion area in the slide-out state. In the embodiment illustrated in FIG. 4, an embodiment in which the basic use area of the display 203 in the slide-in state is seated on the second structure 202 is illustrated. Referring to the embodiment illustrated in FIG. 4 together with FIGS. 1 to 3, the expansion area in the slide-out state of the display 203 may be seated via one of the first structure 201 or the second structure 202.

According to various embodiments, the first structure 201 and the second structure 202 may configure, for example, a single housing 200'. According to various embodiments of the disclosure, as illustrated in FIGS. 1 to 3, the first structure 101 (e.g., the first housing) is separated from the second structure 102 (e.g., the second housing), wherein, when the display 103 area is expanded, the first structure 101 may protrude outward from the second structure 102. However, according to the embodiment illustrated in FIG. 4, in the state in which the first structure 201 is configured as a substantially single housing 200' with the second structure 202, the width of the housing 200' can be widened when the display 203 area is expanded.

According to various embodiments, the first structure 201 may include a first plate 211a (e.g., a slide plate), and may include a first surface F1 including at least a portion of the first plate 211a and a second surface F2 (e.g., F2 in FIG. 2) facing away from the first surface F1. In various embodiments of the disclosure, the first surface F1 of the first plate 211a may be referred to as the first surface F1 of the housing 200', and the second surface F2 of the first plate 211a may also be referred to as the second surface F2 of the housing 200'. According to an embodiment, the first plate 211a may be wound or unwound in the state of being accommodated in the housing 200'.

According to an embodiment, the housing 200' may include a first side member 201a and a second side member 202a (e.g., the first side wall 123a in FIG. 1) facing away from the first side member 201a. According to an embodiment, the first side member 201a may be provided in the first structure 201, and the second side member 202a may be provided in the second structure 202. When it is described that the width of the housing 200' is widened when the display 203 area is expanded, it may mean that the distance between the first side member 201a and the second side member 202a increases, and when it is described that the width of the housing 200' is narrowed when the display area is contracted, it may mean that the distance between the first side member 201a and the second side member 202a decreases. According to an embodiment, the minimum distance between the first side member 201a and the second side member 202a may define a basic use area (a non-expansion area) of the display 203 in the slide-in state.

According to various embodiments, recesses or openings may be configured in some portions of the screen display area of the display 203, and one or more of an audio module (not illustrated), a sensor module (not illustrated), a light-emitting element (not illustrated), and a camera module 249, which are aligned with the recesses or the openings, may be included. In another embodiment (not illustrated), the rear surface of the screen display area of the display 203 may include at least one of an audio module (not illustrated), a sensor module (not illustrated), a camera module 249, a fingerprint sensor (not illustrated), and a light-emitting element (not illustrated).

According to an embodiment, the battery 250 is a device for supplying power to at least one component of the electronic device 200, and may include, for example, a non-rechargeable primary battery, a rechargeable secondary battery, or a fuel cell. At least a portion of the battery 250 may be disposed on substantially the same plane as, for example, the bracket 260 and various electronic components (e.g., a printed circuit board, a processor, etc.) mounted on the bracket 260. The battery 250 may be integrally disposed inside the electronic device 200, or may be detachably disposed on the electronic device 200.

According to various embodiments of the disclosure, the electronic device 200 may include at least one rotation member 270. Referring to FIGS. 1 to 4, the electronic device 200 according to an embodiment may include, as the at least one rotation member, the roller-type rotation member 270. However, this is an example of the rotation member, and the disclosure is not limited thereto. With respect to the above-described roller-type rotation member 270, additionally or alternatively, another type of rotation member may be included as the rotation member. For example, a link member foldably configured inside the housing may be included as the rotation member. In addition, it should be noted that any configuration capable of implementing or inducing a linear motion when the display is expanded using a rotational motion may be included in the scope of a rotation member.

Figure 5A:
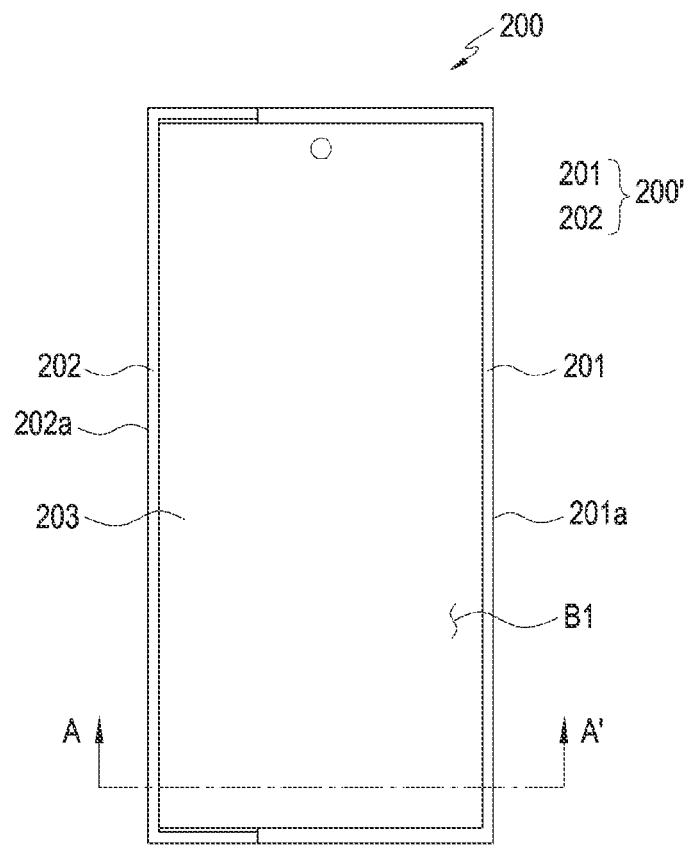
FIG. 5A is a diagram illustrating the electronic device in a state in which the flexible display area is contracted, according to an embodiment.
Figure 5B:
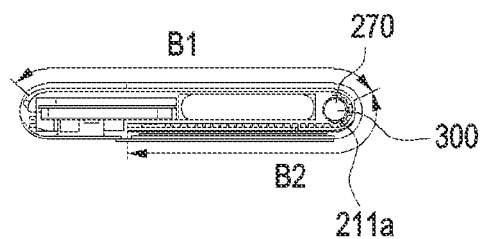
FIG. 5B is a diagram illustrating the electronic device in a state in which the flexible display area is contracted, according to an embodiment.
Figure 6A:
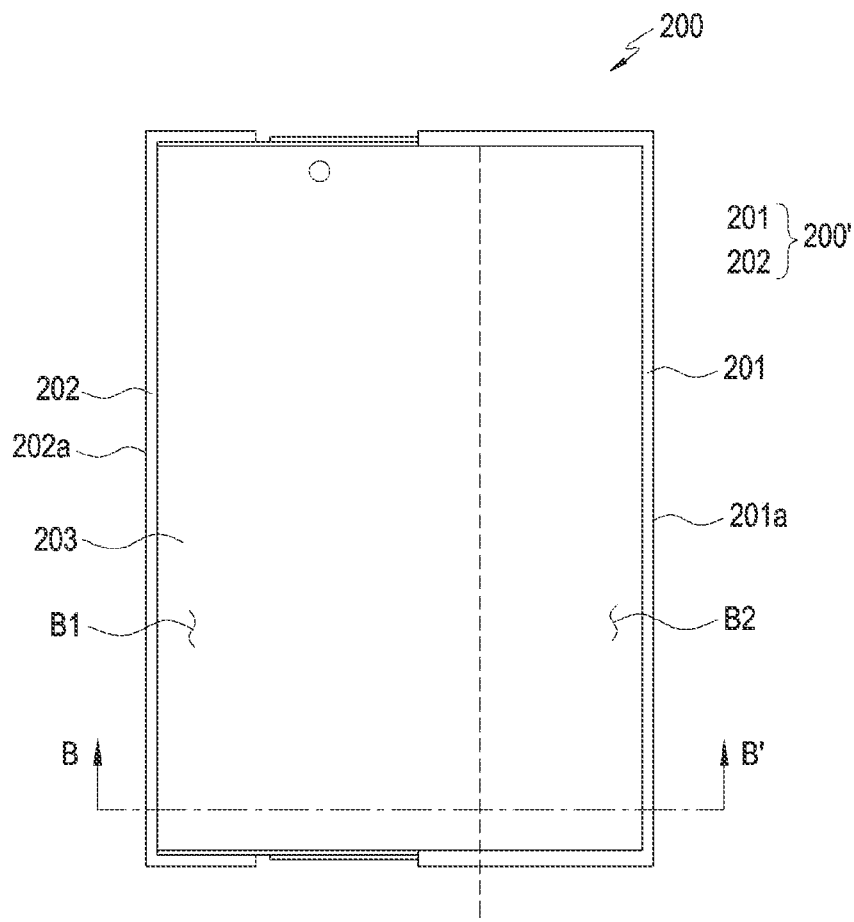
FIG. 6A is a diagram illustrating the electronic device in a state in which the flexible display area is expanded, according to an embodiment.
Figure 6B:
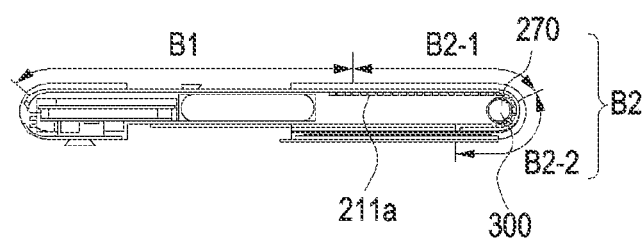
FIG. 6B is a diagram illustrating the electronic device in a state in which the flexible display area is expanded, according to an embodiment.

FIGS. 5A and 5B are diagrams illustrating an electronic device in a state in which the area of the flexible display is contracted, according to an embodiment. FIGS. 6A and 6B are diagrams illustrating the electronic device in a state in which the area of the flexible display is expanded, according to an embodiment.

FIGS. 5A and 5B illustrate the state in which a portion of the flexible display 203 (e.g., the second area B2) is accommodated in the second structure 202. The state illustrated in FIGS. 5A and 5B may be defined as the state in which as first structure 201 is closed with respect to the second structure 202, and the state illustrated in FIGS. 6A and 6B may be defined as the state in which the first structure 201 is opened with respect to the second structure 202.

Referring to FIGS. 5A and 6A, the first structure 201 and the second structure 202 configure the single housing 200'. Thus, a bezel area of the first structure 201 (or the side wall of the first structure 201) may be correspondingly connected to the bezel area of the second structure 202 (or the side wall of the second structure 202).

FIGS. 5A and 5B illustrate the state in which only the basic use area (e.g., the first area B1) in the slide-in state of the display 203 is exposed to the outside. In the slide-out state of the display 203, as illustrated in FIGS. 6A and 6B, the expansion area (e.g., the second area B2) is additionally exposed to the outside so that the first area B1 can be substantially expanded. Referring to FIGS. 6A and 6B, when the first side member 201a of the housing 200' slides, at least a portion B2-2 of the second area B2 is oriented in the first direction (e.g., the direction indicated by arrow ① in FIG. 1 or FIG. 2) so that the first area can be substantially expanded.

Referring to FIGS. 5B and 6B, the second area B2 of the flexible display 203 may extend from the first area B1, wherein a portion (e.g., B2-1) of the second area B2 may be oriented in a first direction that is the same as the first area B1, and another portion (e.g., B2-2) of the second area B2 may be oriented in a second direction opposite to the first direction. According to an embodiment, the other portion (e.g., B2-2) of the second area B2 may be connected to the rear plate (e.g., the rear plate 121b in FIG. 3) of the electronic device 200 so that tension can be maintained by the first plate 211a.

According to some embodiments, the flexible display 203 may be a slidable or rollable type multi-axis variable display. In this case, the flexible display 203 may be variable about multiple axes in a first direction (e.g., the direction indicated by arrow ① in FIG. 1 or FIG. 2).

Figure 7:
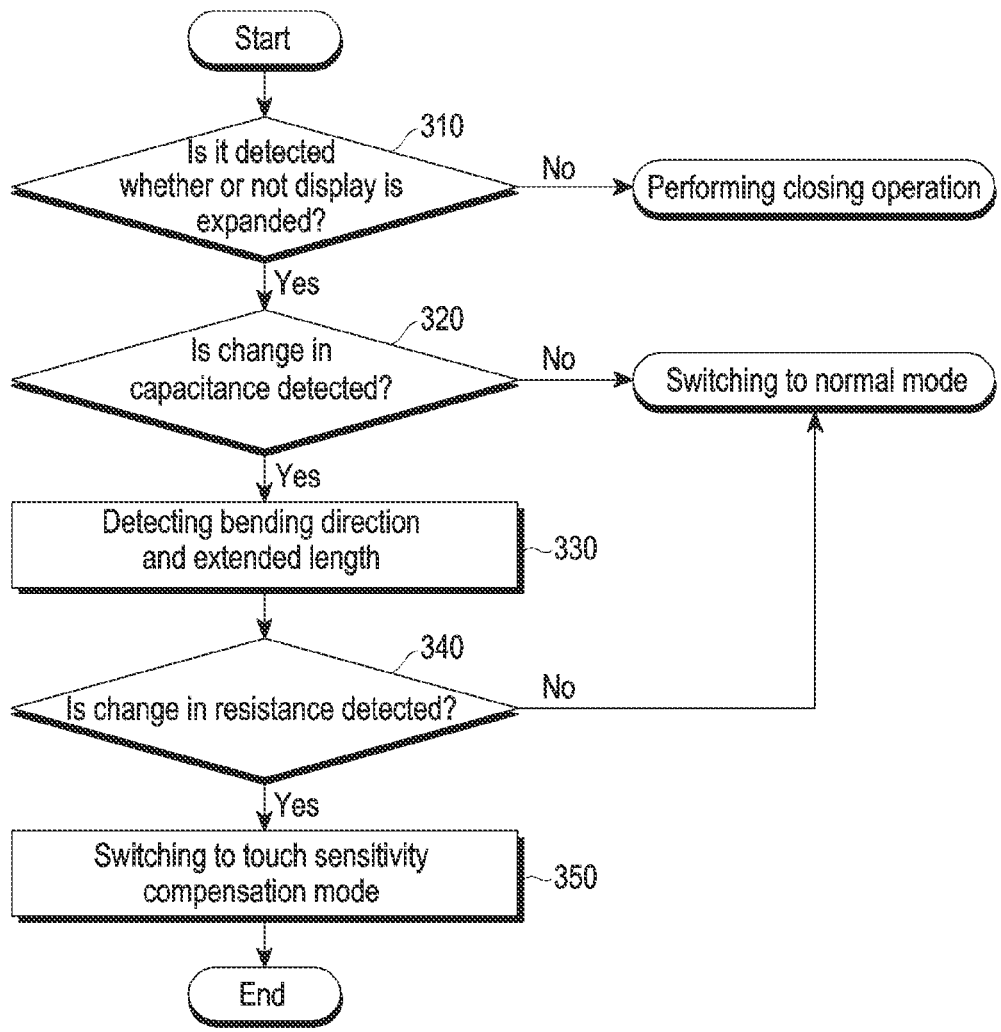
FIG. 7 is a flowchart illustrating a method of detecting and compensating for a change in touch sensitivity of an electronic device, according to an embodiment.

FIG. 7 is a flowchart illustrating a method for detecting and compensating for a change in touch sensitivity of an electronic device, according to an embodiment.

According to various embodiments, a method of compensating for the sensitivity of a touch area of an electronic device (e.g., the electronic device 100 or 200 in FIG. 1 or FIG. 4) may include the following several steps. In performing the following operations, some operations, such as calculation, determination, and confirmation, may be performed by a processor (e.g., the processor 1120 of FIG. 12 to be described later) included in the electronic device.

According to various embodiments, a display (e.g., the display 103 or 203 of FIG. 1 or 4) included in the electronic device (e.g., the electronic device 100 or 200 in FIG. 1 or 4) may be coupled to or disposed adjacent to a touch sensing circuit, a pressure sensor capable of measuring the intensity (pressure) of a touch, and/or a digitizer configured to detect a magnetic-field-type stylus pen.

Hereinafter, operations to be described below will be mainly described with reference to the electronic device 200 described above with reference to FIGS. 4 to 6 among various examples of electronic devices.

First, in operation 310, the electronic device 200 may detect whether or not a display (e.g., the display 203 in FIG. 4) is expanded. As described above, the display 203 may be divided into a basic use area (hereinafter, referred to as a "non-expansion area") (e.g., the first area B1 in FIG. 4) and an expansion area (e.g., the second area B2 in FIG. 4) in which bending or lifting occurs between the layers when the structure is expanded according to the rollable operation. In the state in which the display 203 is not expanded (e.g., see FIGS. 5A and 5B), the expansion area (e.g., the second area B2 in FIGS. 5A and 5B) may be accommodated inside the electronic device, and the housing of the electronic device (e.g., the housing 200' in FIG. 4) may not be visually recognized from the outside. According to various embodiments, the display 203 may be automatically expanded by a user's manipulation or when preset conditions are satisfied. It is possible to identify whether or not the display 203 is expanded may by determining whether or not a user input to expand the display 203 is initiated or whether or not preset conditions for expanding the display 203 are satisfied. Alternatively, it is possible to detect whether or not the display 203 is expanded using a separate sensor (e.g., a rotary sensor, a Hall sensor/magnet, a plurality of switches, a gyro sensor, an acceleration sensor, a grip sensor, a proximity sensor, a gesture sensor, an IR sensor, an illuminance sensor, or an RGB sensor). Whether or not the display is expanded may be identified for each channel of the display (e.g., channels CH1, CH2, CH3, CH4, CH5, CH6, CH7, . . . in FIG. 8), and narrowly, for each node (e.g., nodes n1, n2, n3, n4, . . . in FIG. 8).

When the display 203 is not expanded, a closing operation is performed.

In operation 320, when the display 203 is expanded as illustrated in FIGS. 6A and 6B, the electronic device 200 may detect a change in the touch sensitivity of the extension area (e.g., the second area B2 in FIGS. 6A and 6B) for a predetermined time. According to an embodiment, the detection of the change in touch sensitivity may be confirmed by detecting a change in capacitance. The method of detecting the change in capacitance of the display 203 may be implemented by a method of first detecting a touch capacitance value in consideration of the bending or lifting state of the layers in the non-expansion area (e.g., the first area B1 in FIGS. 6A and 6B) and then detecting a change in capacitance of the expansion area for a predetermined period of time using a basic value ($I_o$ value of a base line in FIG. 8 described below) in consideration of the bending or lifting state. According to an embodiment, a touch capacitance value in consideration of the bending or lifting state in the non-expansion area may be a capacitance value in the non-expansion are in the initial state (or the state in which initial uniformity is secured) before repeating the operation of expanding or non-expanding the display 203 (or before bending or lifting occurs). In operation 320, detecting the change in capacitance may be performed when the user performs a touch operation on the display 203. According to another embodiment, detecting the change in capacitance may be performed on the position of touched coordinates when the user performs a touch operation on the display 203.

According to various embodiments of the disclosure, when a change in the capacitance of the display 203 is detected, the electronic device 200 may more precisely implement the compensation of the touch sensitivity by additionally performing detailed detection for a physical deformation such as bending or stretching of the display 203. According to an embodiment, when a change in the capacitance of the display 203 is detected based on the capacitance value in the non-expansion area in the initial state, the touch sensitivity of the touch panel may be uniformly adjusted wholly or partially.

The display 203 may be configured by laminating a plurality of layers, and an adhesive component, such as optically clear adhesive (OCA) or pressure sensitive adhesive (PSA), may be placed between respective layers. In the layered structure of the plurality of layers, physical deformation may occur due to repetition of an opened state or a closed state of the electronic device, and thus, bending may occur.

In operation 330, when there is a change in the capacitance of the display 203, the electronic device 200 may detect a bending direction and an extended length of the expansion area (e.g., the second area B2 in FIGS. 6A and 6B). Here, the bending direction of the expansion area B2 may be determined based on the rolling direction when the display 203 is rolled. For example, when the rolling direction of the display 203 corresponds to a first rotation direction (e.g., when the rotation member 270 of FIGS. 6A and 6B rotates clockwise), the bending direction of the extended area may be a left-right tensile direction with reference to a reference point (e.g., an arbitrary point on the expansion area B2). In addition, for example, when the rolling direction of the display 203 corresponds to a second rotation direction (e.g., when the rotation member 270 of FIGS. 6A and 6B rotates counterclockwise), the bending direction of the extension area may be a compression direction opposite to the tensile direction with reference to the reference point (e.g., an arbitrary point on the extension area B2).

According to various embodiments, the operation of detecting the bending direction and the extending length of the display 203 may be implemented by a separate sensor. According to an embodiment, when the display 203 is automatically expanded by driving a motor, the position of the display 203 may be estimated based on the number of rotations of the motor. According to another embodiment, a method of estimating a shifted relative position of the display 203 based on the position of a plate (e.g., a multi-bar plate) provided at the lower end of the display when the display is expanded or contracted may also be applied. According to another embodiment, it is also possible to apply a method of estimating the movement distance of the display 203 by mounting a magnet on a display expansion part and measuring a magnetic field generated from the magnet using a sensor. According to another embodiment, it is also possible to apply a method of measuring the distance between the basic position of the display and the position in the state in which the display 203 is in the expanded or contracted state by calculating the travel time of light using an optical sensor (e.g., a time of flight (TOF) sensor). According to another embodiment, a rotary sensor may be provided on the rotation member 270 described above with reference to FIG. 4 and the position of the display may be estimated based on the rotary sensor. When there is a change in the capacitance of the display 203, the position of the display may be estimated, and the bending direction and the stretched length of the expansion area (e.g., the second area B2 in FIGS. 6A and 6B) may be detected.

In operation 340, the operation of detecting whether or not the resistance of the display expansion area is changed may be performed using a sensor capable of detecting a resistance value. For example, a resistance measurement type strain gauge sensor may be used. After subdividing the display 203 expansion area (e.g., the second area B2 in FIGS. 6A and 6B) and detecting different sensitivity values for each area, the change in resistance may be calculated based on the bending and deformation state of the panel using the strain gauge sensor.

For example, when a change in touch sensitivity (e.g., a change in capacitance) is not detected in operation 320 or a change in resistance is not detected in operation 340, it may be estimated that no bending or lifting of the display has occurred. Accordingly, the electronic device 200 ceases performance of the touch sensitivity compensation operation and switches to the normal mode.

According to various embodiments, when a change in resistance is detected in operation 350, the electronic device 200 may switch to a compensation mode in which an operation for compensating for (or correcting) a change in touch sensitivity according to bending or lifting of the touch panel is performed. The operation of compensating for the touch sensitivity of the touch panel may include an operation of adjusting a threshold, a gain, or a control voltage Vcon for a touch input of the touch panel. According to an embodiment, the threshold for the touch input of the touch panel may be increased or decreased depending on the degree of bending or the increased length. For example, a distance between a plurality of laminate layers constituting the display 203 (e.g., a distance in a direction parallel to the Z-axis in FIG. 4) may increase to reduce touch sensitivity. In this case, the threshold related to the touch sensitivity may be decreased by 10% compared to the existing one, or the gain may be increased by 20% or more. In addition, for example, the layers may be stretched by a predetermined length in at least one direction (e.g., a direction parallel to the X-axis and/or Y-axis direction in FIG. 4) as the display 203 is stretched or compressed. In such a case, the threshold related to touch sensitivity may be decreased by 5% compared to the existing one, or the gain may be increased by 10% or more. Adjustments of the actual limit value and the gain value may vary from embodiment to embodiment.

According to various embodiments, in operation 350, the operation of compensating for the touch sensitivity of the touch panel may include an operation of increasing the number of driving units of driving conductive lines included in the touch panel.

According to various embodiments, the operation of compensating for the touch sensitivity may be performed for each channel (e.g., channels CH1, CH2, CH3, CH4, CH5, CH6, CH7, . . . in FIG. 8) and narrowly, for each node (e.g., nodes (n1, n2, n3, n4, . . . in FIG. 8), in the expansion area B2 of the display 203. According to an embodiment, the touch sensitivity of the touch panel may be compensated for by increasing the number of driving units for driving the conductive lines for each channel or node.

In relation to detecting whether or not the resistance of the display expansion area changes at 340 of FIG. 7, a display (e.g., the display 203 in FIG. 4) including a touch panel 400 for measuring a change in resistance, is described in detail below with respect to FIG. 8.

Figure 8:
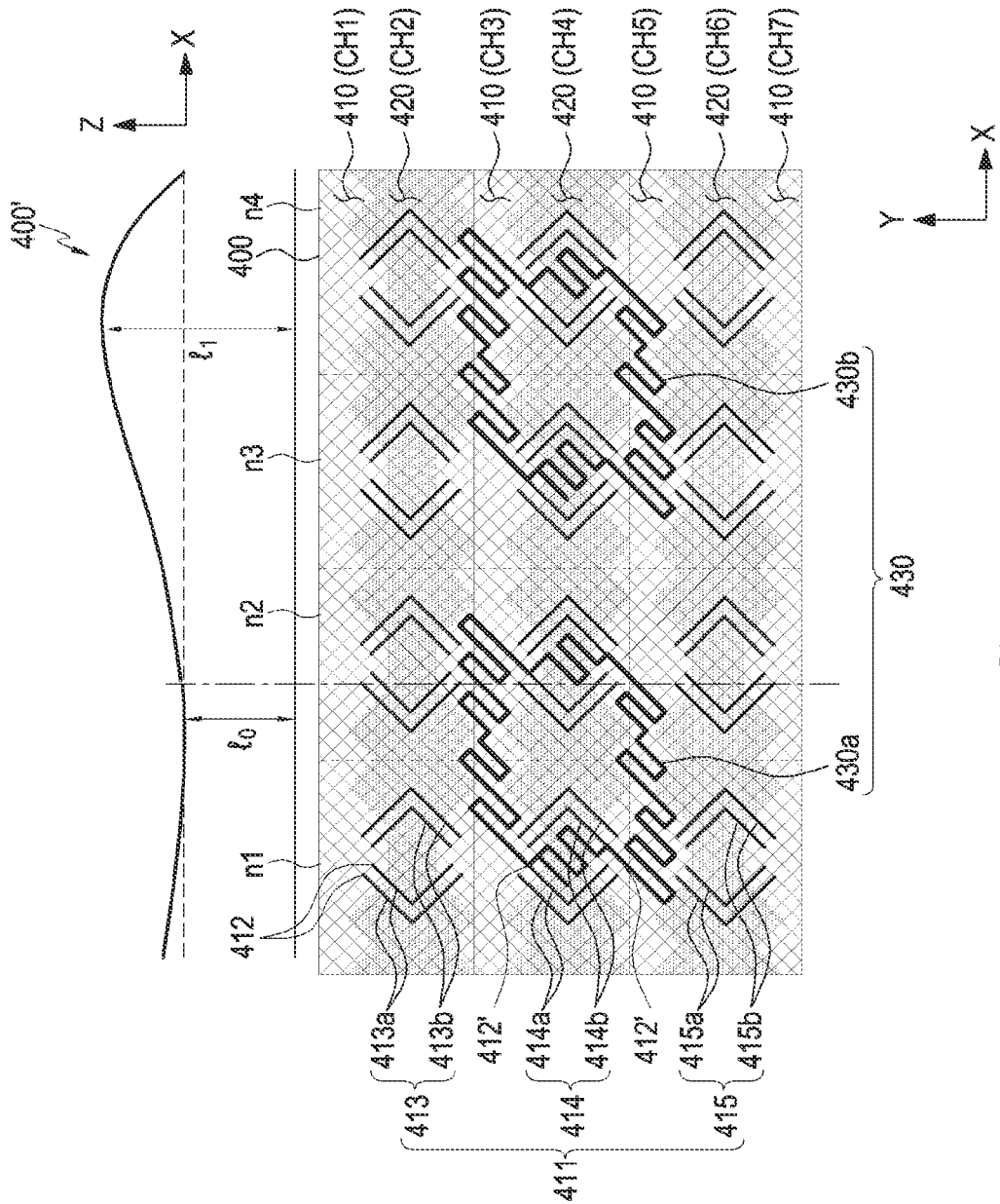
FIG. 8 is a diagram illustrating a cross-sectional structure of a touch panel of an electronic device, according to an embodiment.
Figure 9:
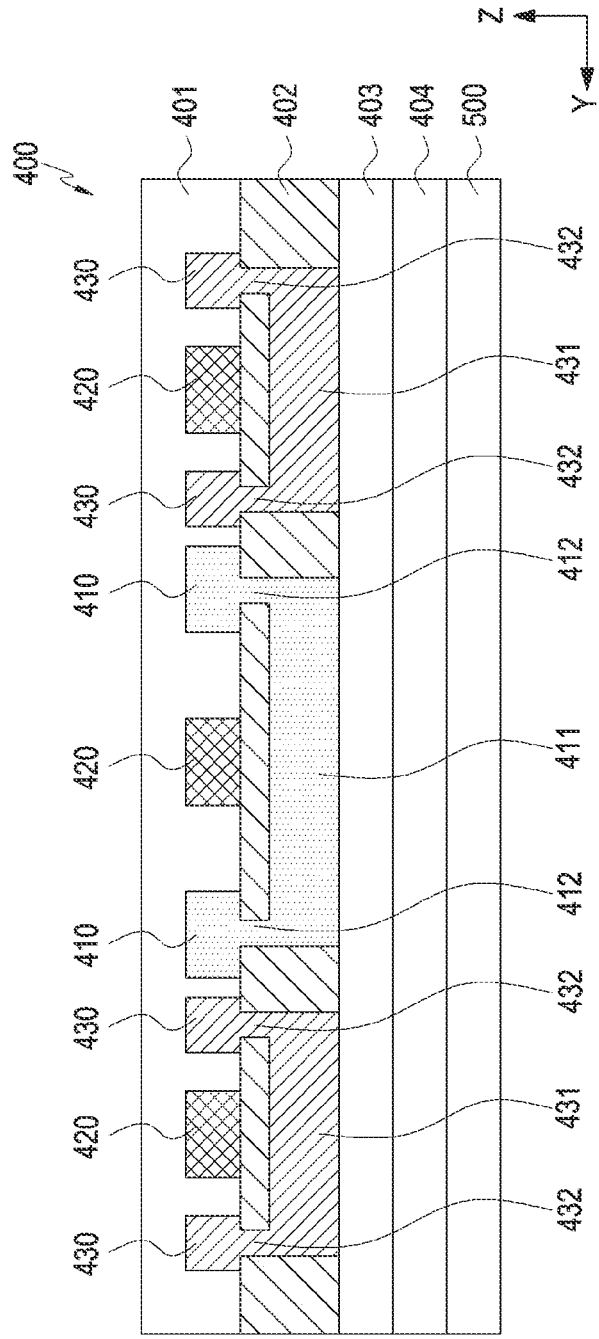
FIG. 9 is a diagram illustrating a state in which an insulating layer image is projected onto a conductive layer image, according to an embodiment.

FIG. 8 is a diagram illustrating electrode layers and strain gauge sensors of a touch panel of an electronic device, according to an embodiment. FIG. 9 is a diagram illustrating a cross-sectional structure of a touch panel of an electronic device, according to an embodiment. FIG. 8 may illustrate a projected image of an insulating image 402 when the cross-sectional structure of the touch panel of FIG. 9 is viewed from above a touch panel 400.

According to some embodiments, the display 203 may include a display panel 500, a polarizing layer (not illustrated) disposed on the display panel 500, and a window member (not illustrated) forming an exterior of the display.

The display panel 500, the polarizing layer (not illustrated), and the window member (not illustrated) may form one display 203, and may be made of a flexible material.

According to an embodiment, the display 203 may be at least partially made of a material that transmits radio waves or magnetic fields. The display 203 is equipped with the display panel 500 and/or the touch panel 400. Accordingly, the display 500 may be utilized as an input device provided with a touch screen function while being utilized as an output device for outputting a screen. The display panel 500 may include a display element layer including one or more pixels and a thin film transistor (TFT) layer connected to the display element layer. According to various embodiments, the display panel 500 may correspond to a panel such as a liquid crystal display (LCD), an LED, or an active-matrix organic light emitting diode (AMOLED), and may display various images according to various operation states, application execution, and contents of the electronic device 200. For example, a youm-on cell touch AMOLED (YOCTA) display may be described with reference to FIGS. 8 and 9.

The electronic device 200 may detect an input on the surface of the display 203 using the touch panel 400. Here, the input capable of being recognized by the touch panel 400 may include not only an input through direct contact with the surface of the display 203, but also an input through hovering. According to an embodiment, the touch panel 400 may have substantially the same area as the display panel 500 and may be disposed adjacent to the display panel 500. According to various embodiments, the touch panel 400 may be disposed on the top surface of the display panel 500. As an embodiment, FIG. 8 illustrates the state in which the touch panel 400 is provided between the display panel 500 and a polarizing layer (not illustrated).

According to various embodiments, as the touch panel 400, various types of touch panels may be included. For example, various touch panels, such as a capacitive touch panel that detects a change in capacitance, a pressurized touch panel that detects a position by detecting a pressure acting on the panel, an optical touch panel using infrared rays, and a transparent-electrode-type touch panel using contacts of a transparent conductive film, may be used. In addition, various types of input position detection panels not mentioned above, such as an electromagnetic-resonance (hereinafter, referred to as "EMR") type touch panel, may be used.

According to an embodiment, the touch panel 400 may have substantially the same area as the display panel 500, and may be used by being attached to the display panel 500 or being printed on the surface of the display panel 500. For example, when using a digitizer panel as the touch panel 400, the digitizer panel may include a pattern layer on which a transmission pattern (e.g., a Tx pattern) is provided and a pattern layer on which a reception pattern (e.g., an Rx pattern) is provided, and, the transmission pattern and reception pattern layers may be laminated on one another other to generate/detect an electromagnetic field. In addition, according to an embodiment, the digitizer panel may include a pattern layer in which the transmission pattern and the reception pattern are provided on one layer. According to an embodiment, a magnetic field generated from an electromagnetic inductor (an input device (e.g., a stylus pen)) may be detected through an electromagnetic resonance (hereinafter referred to as "EMR") method using a digitizer panel, and various motions of the electromagnetic inductor, such as approaching, clicking, and dragging may be detected.

Referring to FIGS. 8 and 9 together, according to various embodiments of the disclosure, the touch panel 400 may include: a first insulating layer 401, electrode layers 410 and 420 disposed on the first insulating layer 401, a second insulating layer 402 disposed under the first insulating layer 401, strain gauge sensors 430 disposed on the second insulating layer 402, and a first bridge 411 for connection of the electrode layers 410 and 420, disposed on the second insulating layer 402. In addition, the electrode layers 410 and 420 and the first bridge 411 may be connected via first vias 412. According to various embodiments, the touch panel 400 may be disposed on the top surface of the display panel 500 and may further include an interlayer dielectric layer 403 and a thin film encapsulation layer 404. According to some embodiments, a first insulating layer 401 including the electrode layers 410 and 420 and a second insulating layer 402 including the bridges 411 and 431 may be positioned under the display panel 500.

Here, the electrode layers 410 and 420 may include first electrodes 410 on which a transmission pattern (e.g., a Tx pattern) is provided and second electrodes 420 on which a reception pattern (e.g., an Rx pattern) is formed. According to an embodiment, each of the first electrodes 410 and the second electrodes 420 may be provided in the form of a metal mesh. According to an embodiment, the first electrodes 410 and the second electrodes 420 may be provided in one layer (e.g., the first insulating layer 401) in the form of a metal mesh.

According to various embodiments, the first electrodes 410 and the second electrodes 420 may be alternately disposed in one layer (e.g., the first insulating layer 401). Referring to FIG. 8, the second electrodes 420 may be provided in the areas indicated by a darker shade than the first electrodes 410, and the plurality of second electrodes 420 alternate with the plurality of first electrodes 410. The first electrodes 410 and the second electrodes 420 formed in the form of a metal mesh may include, for example, conductive lines in the form of a mesh or a grid. The XY coordinate system of the touch panel 400 may be configured using the plurality of conductive lines of the first electrodes 410 and the second electrodes 420. According to various embodiments, in the embodiment illustrated in FIG. 8, the first electrodes 410 on which a transmission pattern (e.g., a Tx pattern) is formed and the second electrodes 420 on which a reception pattern (e.g., an Rx pattern) is provided are disclosed. However, the disclosure is not necessarily limited thereto, and a configuration in which a reception pattern (e.g., an Rx pattern) is provided on the first electrodes 410 and a transmission pattern (e.g., a Tx pattern) is provided on the second electrodes 420 is also applicable.

In the touch panel 400, a first via 412 may be provided for electrical connection of conductive lines adjacent to at least one end thereof among the conductive lines provided on the first electrodes 410. According to an embodiment, the first via may be provided by filling a via hole provided in the touch panel 400 with a conductive material.

According to various embodiments, different first electrodes 410 disposed adjacent to each other with a second electrode 420 interposed therebetween may be electrically connected to each other by using a first bridge 411.

The first bridge 411 is configured to connect one end of a conductive line of one first electrode 410 to one end of a conductive line of another first electrode 410, and may be disposed in a layer (e.g., the second insulating layer 402) different from that of the first electrodes 410. For example, in a display to which a metal mesh structure is applied, the first bridge 411 may be utilized in order to avoid interference with the second electrodes 420 when interconnecting the plurality of first electrodes 410.

According to the embodiment illustrated in FIG. 8, in order to connect two different first electrodes 410, a plurality of first bridges (e.g., a $(1-1)^{th}$ bridge 413, a $(1-2)^{th}$ bridge 414, and a $(1-3)^{th}$ bridge 415) may be provided. All of the plurality of first bridges (e.g., the $(1-1)^{th}$ bridge 413, the $(1-2)^{th}$ bridge 414, and the $(1-3)^{th}$ bridge 415) may be provided in a layer (e.g., the second insulating layer 402) different from that of the first electrodes 410 may be formed. A plurality of first electrodes 410, which are electrically separated from each other due to the second electrodes 420, may be electrically connected to each other by the plurality of first bridges (e.g., the $(1-1)^{th}$ bridge 413, the $(1-2)^{th}$ bridge 414, and the $(1-3)^{th}$ bridge 415). According to various embodiments, each of the plurality of first bridges (e.g., the $(1-1)^{th}$ bridge 413, the $(1-2)^{th}$ bridge 414, and the $(1-3)^{th}$ bridge 415) may be provided as pairs of bridge groups 413a and 413b, 414a and 414b, or 415a and 415b. For example, when one bridge 413a is cut off or short-circuited in the $(1-1)^{th}$ bridges 413, electrical connection may be secured using the other bridge 413b. In this way, the first bridges may be provided in pairs from the viewpoint of product yield.

According to various embodiments of the disclosure, a strain gauge sensor 430 for detecting a change in touch sensitivity of the touch panel 400 inside the display 203 may be further included. According to an embodiment, the strain gauge sensor 430 may be provided in the first insulating layer 401, and may be provided in a dummy section of the first insulating layer 402. Here, the dummy section of the first insulating layer 401 may mean a portion of the first insulating layer 401 in which the first electrodes 410 and the second electrodes 420 are not provided, and may be an area between a first electrode 410 and a second electrode 420.

Referring to FIG. 8, the strain gauge sensor 430 may be provided over a plurality of channels (or a plurality of nodes) to cover a plurality of channels (or a plurality of nodes) on the touch panel 400. A plurality of strain gauge sensors 430 (430a and 430b) may be provided.

According to various embodiments, the portion 412' very close to a strain gauge sensor 430 and a portion of the electrode (e.g., one end 412' of a first electrode 410) may be provided with an insulator or electrically connected so as to prevent an influence on a touch signal flow and prevent occurrence of electrical short circuit.

Referring to FIG. 9, the second insulating layer 402 may include a second bridge 431 for connection of the strain gauge. The second bridge 431 may serve to connect a plurality of strain gauges provided in the first insulating layer 401, and the second bridge 431 may also be provided in a dummy section in which no first bridge 411 of the first electrodes is provided in the second insulating layer. Accordingly, it is possible to provide a strain gauge sensor as a means for precisely detecting the sensitivity of the touch panel without increasing the volume of the touch panel.

Referring to FIGS. 7 to 9 together, according to various embodiments of the disclosure, it is possible to provide, on the same layer of the display, touch sensitivities, which are different from each other by a changed amount of capacitance (e.g., a Delta value) obtained by comparing a touch capacitance value in consideration of the state of bending and lifting between layers in the display 203 non-expansion area and a strain value ($\varepsilon = \Delta l_1 / l_0$) in consideration of the state of bending and lifting between layers in a rolling area.

According to various embodiments, regarding a change in touch sensitivity in the expansion area during the rolling of the display, first a basic value (a base line) for the expansion area (e.g., B2 in FIG. 4) with reference to the non-expansion area (e.g., B1 in FIG. 4) of the touch panel is traced for a predetermined length of time, and a change amount in the capacitance value is calculated cap=A/1e(permittivity) after the predetermined length of time. After detecting different capacitance values for each channel (or node), it is possible to calculate changes in a physical deformation state, such as bending or stretching of the panel, based on a change in the resistance of a strain gauge (R=ρ1/A). Through this, numerical values for resistance R and capacitance C are calculated, and by using these inversely, it is possible to compensate for a touch sensitivity depending on the degree of physical deformation, such as bending or stretching, of the panel. When the touch panel 400 is bent or expanded in a specific direction depending on the rolling direction of the display, it is possible to precisely compensate for the touch sensitivity by detecting the tension and compression directions and lengths of the strain gauge sensor and correcting the touch sensitivity according to the directions and lengths.

Figure 10:
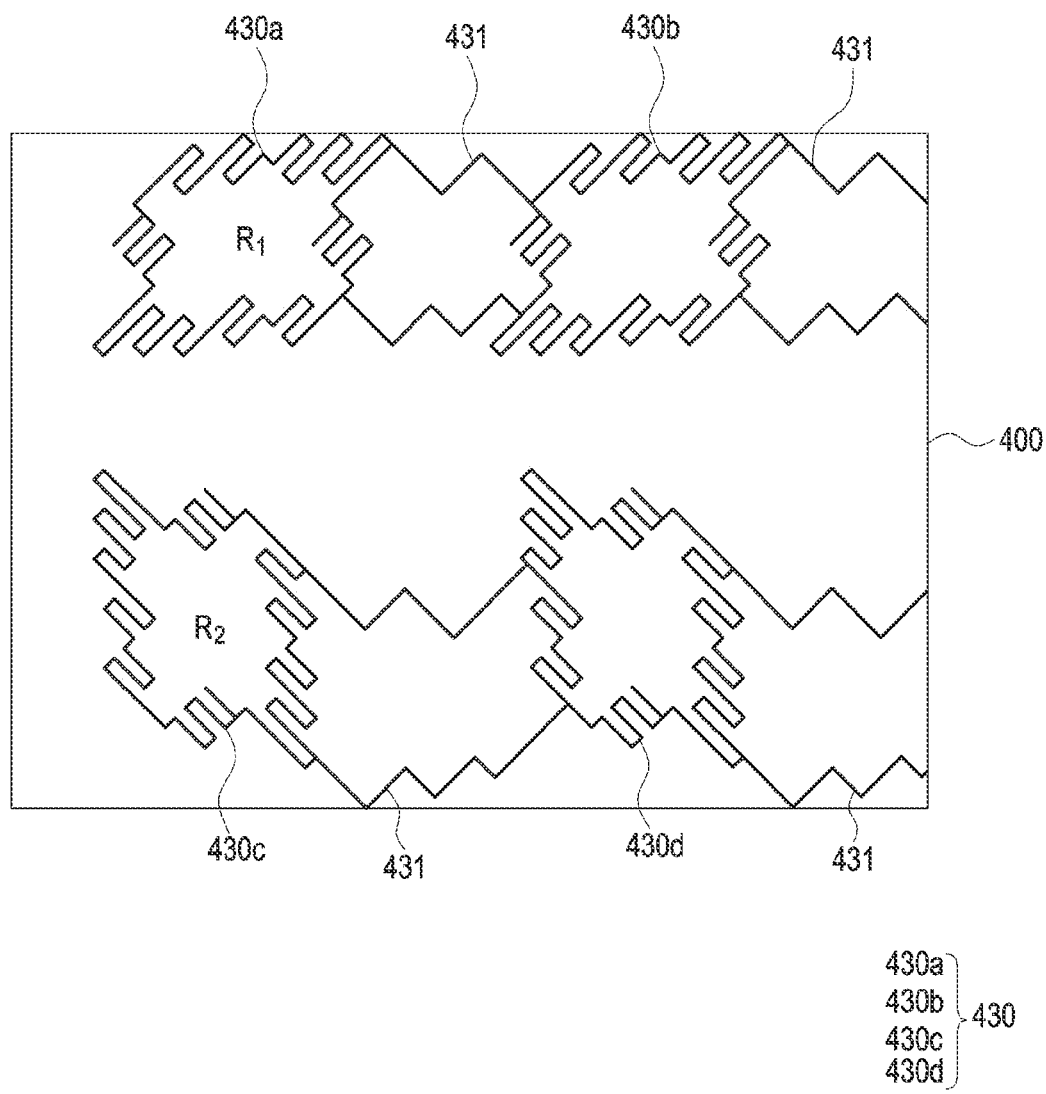
FIG. 10 is a diagram illustrating strain gauge sensors, according to an embodiment.
Figure 11:
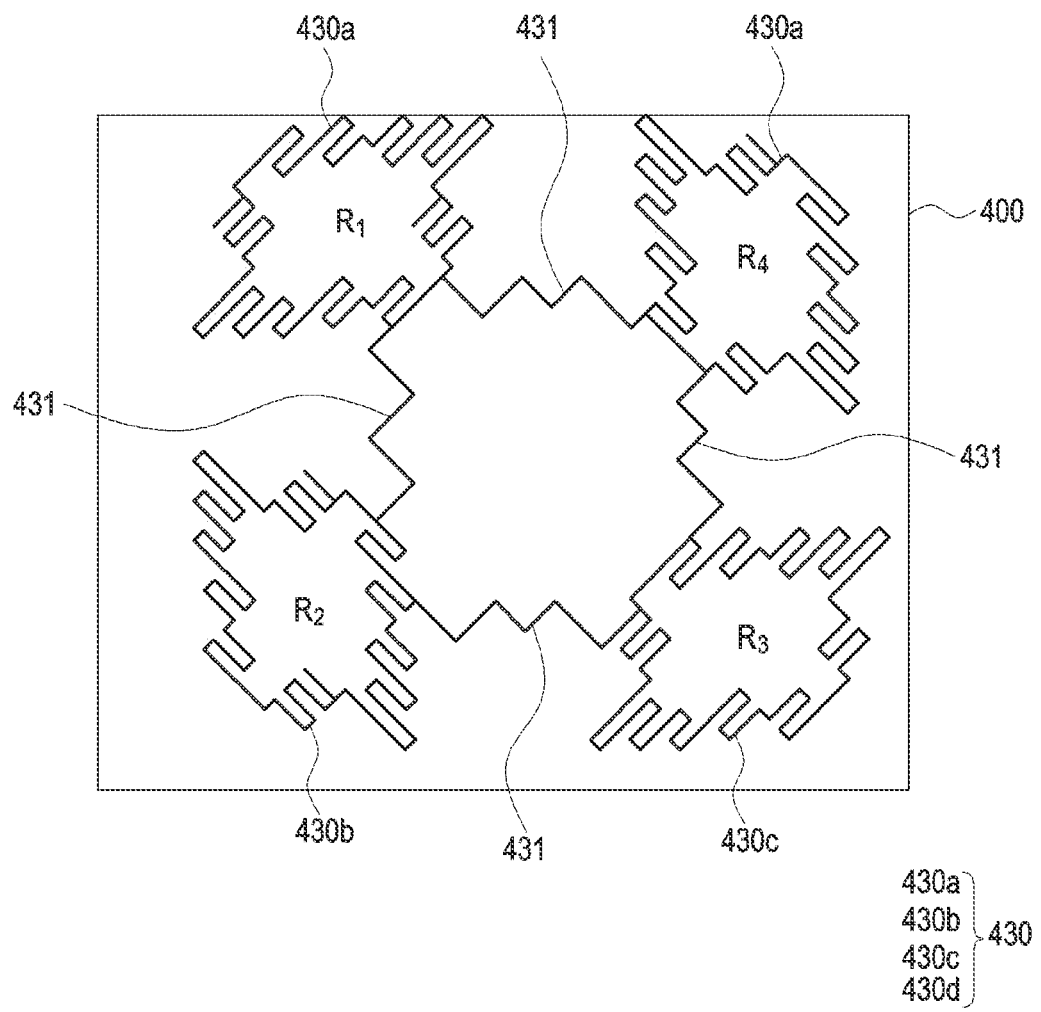
FIG. 11 is a diagram illustrating strain gauge sensor, according to another embodiment.

FIG. 10 is a diagram illustrating strain gauge sensors, according to an embodiment. FIG. 11 is a diagram illustrating strain gauge sensors, according to an embodiment.

According to various embodiments, a plurality of strain gauge sensors 430a, 430b, 430c, and 430d may be provided, and two or more strain gauge sensors may be connected to each other in one direction in the form of a via bridge.

Referring to FIG. 10, according to various embodiments of the disclosure, each strain gauge sensor 430 utilizes a dummy section of the touch sensor, and for effective sensor design of the dummy sections, strain gauge sensors 430 may be connected to each other using via holes (e.g., 432 in FIG. 9), which makes it easy to secure the extended length of the sensors as much as possible. According to various embodiments of the disclosure, by applying a form in which via holes (e.g., 432 in FIG. 9) and second bridges 431 for connecting a plurality of strain gauge sensors 430a, 430b, 430c, and 430d are connected to each other (hereinafter, referred to as a "via bridge"), the strain gauge sensors 430 may be effective in maximizing a change in resistance while securing the length and retreat path of the strain gauge electrodes without affecting the areas of existing touch electrodes (e.g., the first electrode (e.g., 410 in FIG. 8) and second electrodes (e.g., 420 in FIG. 8)).

According to various embodiments, a plurality of strain gauge sensors 430a, 430b, 430c, and 430d may be provided, and four strain gauge sensors may be connected in the form of a Wheatstone bridge.

Referring to FIG. 11, the strain gauge sensors 430a, 430b, 430c, and 430d may be provided in the form of a Wheatstone bridge using a bridge balance formula of R1*R3=R2*R4 in order to precisely detect a change in resistance in a small area. In this way, it is easy to increase the resolution of the strain gauge sensors 430a, 430b, 430c, and 430d by using a method of detecting bending and deformation of a panel at a local area (e.g., a node) according to display rolling. In the sensor, R1, R2, R3, and R4 may be connected to each other in the form of a via bridge in order to maximize a change in the resistance change of the sensor. According to various embodiments, the first strain gauge sensor 430a and a third strain gauge sensor 430c may have the same shape, and a second strain gauge sensor 430b and a fourth strain gauge sensor 430d may have the same shape.

Figure 12:
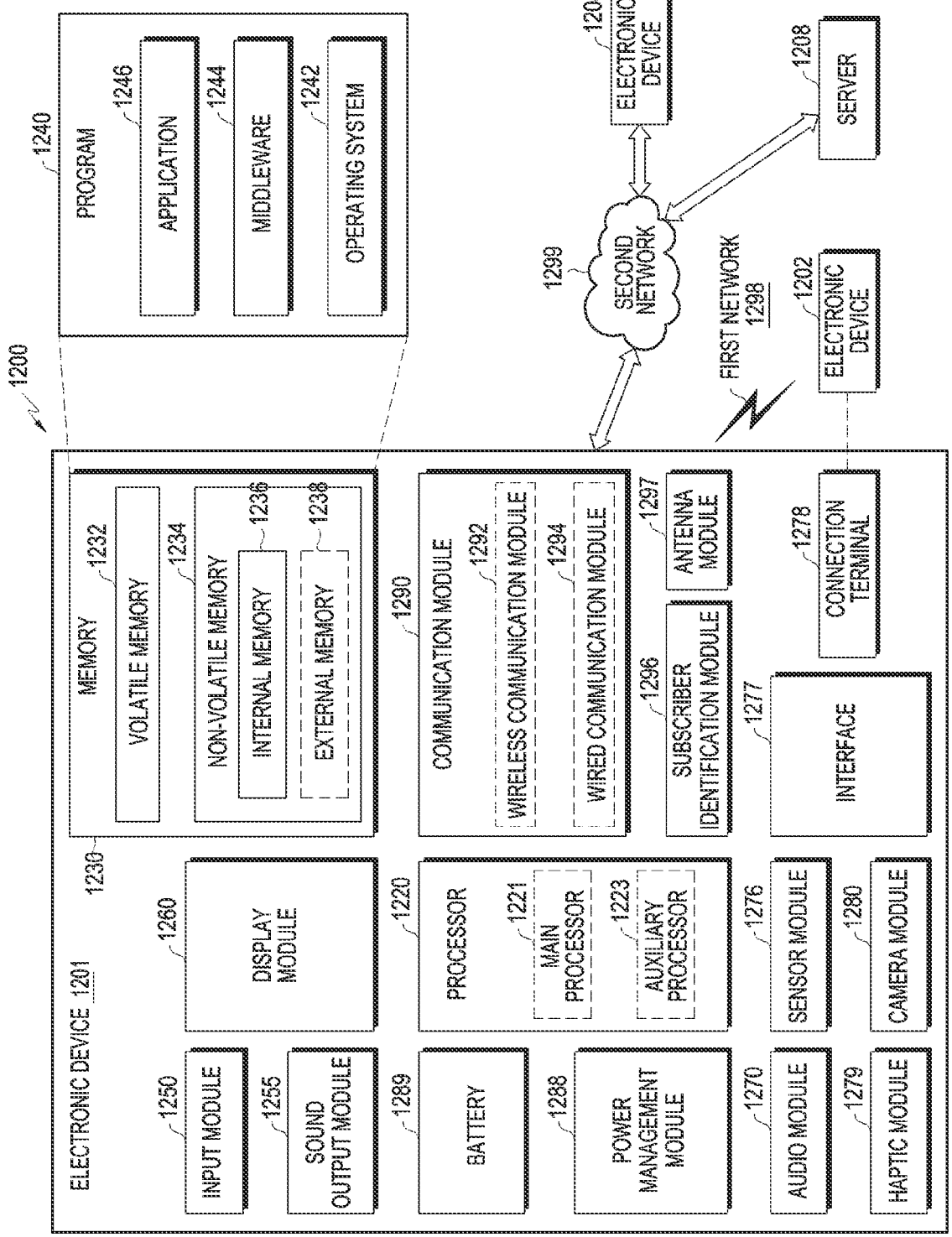
FIG. 12 is a block diagram of an electronic device in a network environment, according to an embodiment.

FIG. 12 is a block diagram illustrating an electronic device 1201 in a network environment 1200 according to various embodiments. Referring to FIG. 12, the electronic device 1201 in the network environment 1200 may communicate with an electronic device 1202 via a first network 1298 (e.g., a short-range wireless communication network), or an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input module 1250, a sound output module 1255, a display module 1260, an audio module 1270, a sensor module 1276, an interface 1277, a connecting terminal 1278, a haptic module 1279, a camera module 1280, a power management module 1288, a battery 1289, a communication module 1290, a subscriber identification module (SIM) 1296, or an antenna module 1297. In some embodiments, at least one of the components (e.g., the connecting terminal 1278) may be omitted from the electronic device 1201, or one or more other components may be added in the electronic device 1201. In some embodiments, some of the components (e.g., the sensor module 1276, the camera module 1280, or the antenna module 1297) may be implemented as a single component (e.g., the display module 1260).

The processor 1220 may execute, for example, software (e.g., a program 1240) to control at least one other component (e.g., a hardware or software component) of the electronic device 1201 coupled with the processor 1220, and may perform various data processing or computation. According to one embodiment, as at least part of the data processing or computation, the processor 1220 may store a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), or an auxiliary processor 1223 (e.g., a graphics processing unit (GPU), a neural processing unit (NPU), an image signal processor (ISP), a sensor hub processor, or a communication processor (CP)) that is operable independently from, or in conjunction with, the main processor 1221. For example, when the electronic device 1201 includes the main processor 1221 and the auxiliary processor 1223, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control, for example, at least some of functions or states related to at least one component (e.g., the display module 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active (e.g., executing an application) state. According to an embodiment, the auxiliary processor 1223 (e.g., an image signal processor or a communication processor) may be implemented as part of another component (e.g., the camera module 1280 or the communication module 1290) functionally related to the auxiliary processor 1223. According to an embodiment, the auxiliary processor 1223 (e.g., the neural processing unit) may include a hardware structure specified for artificial intelligence model processing. An artificial intelligence model may be generated by machine learning. Such learning may be performed, e.g., by the electronic device 1201 where the artificial intelligence is performed or via a separate server (e.g., the server 1208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input module 1250 may receive a command or data to be used by another component (e.g., the processor 1220) of the electronic device 1201, from the outside (e.g., a user) of the electronic device 1201. The input module 1250 may include, for example, a microphone, a mouse, a keyboard, a key (e.g., a button), or a digital pen (e.g., a stylus pen).

The sound output module 1255 may output sound signals to the outside of the electronic device 1201. The sound output module 1255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1260 may visually provide information to the outside (e.g., a user) of the electronic device 1201. The display module 1260 may include, for example, a display, a hologram device, or a projector and control circuitry to control a corresponding one of the display, hologram device, and projector. According to an embodiment, the display module 1260 may include a touch sensor adapted to detect a touch, or a pressure sensor adapted to measure the intensity of force incurred by the touch.

The audio module 1270 may convert a sound into an electrical signal and vice versa. According to an embodiment, the audio module 1270 may obtain the sound via the input module 1250, or output the sound via the sound output module 1255 or an external electronic device (e.g., an electronic device 1202 (e.g., a speaker or a headphone)) directly or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, an HDMI connector, a USB connector, an SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to one embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device 1204 via the first network 1298 (e.g., a short-range communication network, such as Bluetooth™, wireless-fidelity (Wi-Fi) direct, or infrared data association (IrDA)) or the second network 1299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify or authenticate the electronic device 1201 in a communication network, such as the first network 1298 or the second network 1299, using subscriber information (e.g., international mobile subscriber identity (IMSI)) stored in the subscriber identification module 1296.

The wireless communication module 1292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1292 may support a high-frequency band (e.g., the mmWave band) to achieve, e.g., a high data transmission rate. The wireless communication module 1292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1292 may support various requirements specified in the electronic device 1201, an external electronic device (e.g., the electronic device 1204), or a network system (e.g., the second network 1299). According to an embodiment, the wireless communication module 1292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1297 may transmit or receive a signal or power to or from the outside (e.g., the external electronic device) of the electronic device 1201. According to an embodiment, the antenna module 1297 may include an antenna including a radiating element composed of a conductive material or a conductive pattern formed in or on a substrate (e.g., a printed circuit board (PCB)). According to an embodiment, the antenna module 1297 may include a plurality of antennas (e.g., array antennas). In such a case, at least one antenna appropriate for a communication scheme used in the communication network, such as the first network 1298 or the second network 1299, may be selected, for example, by the communication module 1290 from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

According to various embodiments, the antenna module 1297 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 or 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 1204 may include an internet-of-things (IoT) device. The server 1208 may be an intelligent server using machine learning and/or a neural network. According to an embodiment, the external electronic device 1204 or the server 1208 may be included in the second network 1299. The electronic device 1201 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

A method is provided for compensating for changed touch sensitivity of a touch panel of an electronic device. It is detected whether a rollable display of the electronic device is expanded. It is detected whether the touch sensitivity of the touch panel of the rollable display is changed, in case that the rollable display is expanded. A rolling direction and a length of extension of the rollable display is changed, in case that the touch sensitivity is changed. It is detected whether a resistance of an expansion area of the rollable display is changed. The touch sensitivity of the touch panel is compensated for, in case that the resistance is changed.

According to various embodiments, the operation of detecting whether the rollable display is expanded may be performed based on a determination of whether a user input for expanding the rollable display is initiated or whether a preset condition for expanding the rollable display is satisfied.

According to various embodiments, the operation of detecting whether or not the display is expanded may be performed via an expansion detection sensor.

According to various embodiments, the operation of detecting the touch sensitivity of the touch panel is changed includes detecting a capacitance value in consideration of a bending state or lifting state in a non-expansion area of the rollable display and detecting a change in a capacitance in the expansion area for a predetermined time using the capacitance value at the bending or lifting state in the non-expansion area as a basic value.

According to various embodiments, the operation of detecting whether or not the resistance of the expansion area of the rollable display is changed may be performed using at least one resistance measurement type strain gauge sensor.

According to various embodiments, the at least one strain gauge sensor may be disposed in a dummy section of the touch panel.

According to various embodiments, The at least one resistance measurement type strain gauge sensor may include a plurality of strain gauge sensors, and two or more of the plurality of strain gauge sensors may be connected in one direction in the form of a via bridge.

According to various embodiments, the at least one resistance measurement type strain gauge sensor may include a plurality of strain gauge sensors, and four of the plurality of strain gauge sensors may be connected in a Wheatstone bridge form.

According to various embodiments, the operation of compensating for the touch sensitivity of the touch panel may include an operation of adjusting a threshold value, a gain, or a control voltage for a touch input of the touch panel.

According to various embodiments, the operation of compensating for the touch sensitivity of the touch panel may include an operation of increasing the number of driving units of driving conductive lines included in the touch panel.

A rollable display including a touch panel is provided. The rollable display includes a first insulting layer, and an electrode layer disposed on the first insulating layer. The rollable display also includes a second insulating layer disposed under the first insulating layer, and at least one strain gauge sensor disposed on the first insulating layer. The rollable display further includes a first bridge for connection of the electrode layer, disposed on the second insulating layer. The electrode layer is connected to the first bride using a first via.

According to various embodiments, the electrode layer may include a first electrode layer and the second electrode layer, and the first electrode layer and the second electrode layer may be configured in a form of a metal mesh.

According to various embodiments, the at least one strain gauge sensor may be disposed in a dummy section of the first insulating layer.

According to various embodiments, the rollable display may further include a second bridge for connection of the at least one strain gauge, disposed on the second insulating layer.

According to various embodiments, at least one strain gauge sensor may include a plurality of strain gauge sensors, and two or more of the plurality of strain gauge sensors may be connected in one direction in the form of a via bridge.

According to various embodiments, at least one strain gauge sensor may include a plurality of strain gauge sensors, and four of the plurality of strain gauge sensors may be connected in a Wheatstone bridge form.

A rollable display including a touch panel is provided. The rollable display includes a first insulting layer, and an electrode layer disposed on the first insulating layer and including a first electrode and a second electrode configured in a form of a metal mesh. The rollable display also includes a second insulating layer disposed under the first insulating layer, and at least one strain gauge sensor disposed in a dummy section of the first insulating layer. The rollable display further includes a first bridge for connection of the electrode layer, disposed on the second insulating layer, and a second bridge for connection of the at least one strain gauge sensor, disposed on the second insulating layer. The electrode layer is connected to the first bride using a first via. The at least one strain gauge sensor is connected to the second bridge using a second via.

According to various embodiments, at least one strain gauge sensor may include a plurality of strain gauges, and two or more of the plurality of strain gauge sensors may be connected in one direction in the form of a via bridge.

According to various embodiments, at least one strain gauge sensor may include a plurality of strain gauge sensors, and four of the plurality of strain gauge sensors may be connected in a Wheatstone bridge form.

According to various embodiments, the rollable display may be a youm-on cell touch active-matrix organic light emitting diode (AMOLED) (YOCTA).

While the disclosure has been shown and described with reference to certain embodiments thereof, it will be understood by those skilled in the art that various changes in form and detail may be made therein without departing form the scope of the disclosure. Therefore, the scope of the disclosure should not be defined as being limited to the embodiments, but should be defined by the appended claims and equivalents thereof.

What is claimed is:

1. An electronic device comprising:
   a housing including a first housing and a second housing, wherein the second housing is disposed to be movable with respect to the first housing;
   a flexible display including a touch panel, wherein a first area of the flexible display is visually exposed outside of the housing, and wherein a second area of the flexible display is extended from the first area, is operatively connected to the second housing, and is configured to move in accordance with movement of the second housing;
   at least one sensor;
   a processor; and
   a memory storing instructions that, when executed by the processor, cause the electronic device to:
      identify a change of capacitance of the touch panel in case that the second area is moved;
      identify, using the at least one sensor, physical deformation of a visually exposed portion of the second area;
      identify a change of resistance based on the physical deformation of the visually exposed portion of the second area; and
      compensate a touch sensitivity of the touch panel, based on the change of capacitance for a predetermined time and the change of resistance depending on a degree of physical deformation.

2. The electronic device of claim 1, wherein the memory further stores instructions that cause the electronic device to:
   determine whether the second area is moved based on a determination of whether a user input for moving the flexible display is initiated or whether a preset condition for moving the flexible display is satisfied.

3. The electronic device of claim 1, wherein the memory further stores instructions that cause the electronic device to:
   determine whether the second area is moved by using an expansion detection sensor.

4. The electronic device of claim 1, wherein the memory further stores instructions that cause the electronic device to:
   identify the change of capacitance of the touch panel based on a capacitance value in the first area of the flexible display in consideration of a bending state or a lifting state and a change of the capacitance value in the second area for a predetermined time.

5. The electronic device of claim 1, wherein the at least one sensor comprises at least one strain gauge sensor, and wherein the change of the resistance of the second area is obtained by using the at least one strain gauge sensor.

6. The electronic device of claim 1, wherein the at least one sensor comprises at least one strain gauge sensor, and wherein the at least one strain gauge sensor is disposed in a dummy section of the touch panel.

7. The electronic device of claim 1, wherein the at least one sensor comprises at least one strain gauge sensor, and wherein the at least one strain gauge sensor comprises a plurality of strain gauge sensors, and two or more of the plurality of strain gauge sensors are connected in one direction in a form of a via bridge.

8. The electronic device of claim 1, wherein the at least one sensor comprises at least one resistance measurement type strain gauge sensor, and wherein the at least one resistance measurement type strain gauge sensor comprises a plurality of strain gauge sensors, and four of the plurality of strain gauge sensors are connected in a form of a Wheatstone bridge.

9. The electronic device of claim 1, wherein the memory further stores instructions that cause the electronic device to:
   compensate the touch sensitivity of the touch panel by adjusting a threshold value, a gain, or a control voltage for a touch input of the touch panel.

10. The electronic device of claim 1, wherein the memory further stores instructions that cause the electronic device to:
    compensate the touch sensitivity of the touch panel by increasing a number of driving units of driving conductive lines included in the touch panel.

11. A flexible display comprising:
a touch panel including:
  a first insulating layer;
  an electrode layer disposed in the first insulating layer;
  a second insulating layer disposed under the first insulating layer;
  at least one sensor disposed in the first insulating layer;
  a first bridge for connection of the electrode layer, disposed in the second insulating layer beneath the at least one sensor; and
  a second bridge for connection of the at least one sensor, disposed in the second insulating layer beneath an electrode of the electrode layer,
  wherein the electrode layer is connected to the first bridge using a first via, and
the at least one sensor is connected to the second bridge using a second via.

12. The flexible display of claim 11, wherein the electrode layer comprises a first electrode layer and a second electrode layer, and the first electrode layer and the second electrode layer are configured in a form of a metal mesh.

13. The flexible display of claim 11, wherein the at least one is disposed in a dummy section of the first insulating layer.

14. The flexible display of claim 11, wherein the at least one sensor comprises strain gauge sensors connected in one direction in a form of a via bridge.

15. The flexible display of claim 11, wherein the at least one sensor comprises strain gauge sensors connected in a Wheatstone bridge form.

16. A flexible display comprising:
a touch panel including:
  a first insulating layer;
  an electrode layer disposed in the first insulating layer and including a first electrode and a second electrode configured in a form of a metal mesh;
  a second insulating layer disposed under the first insulating layer;
  strain gauge sensor disposed in a dummy section of the first insulating layer;
  a first bridge for connection of the electrode layer, disposed on the second insulating layer beneath at least one of the strain gauge sensors; and
  a second bridge for connection of the strain gauge sensors disposed on the second insulating layer beneath an electrode of the electrode layer,
  wherein the electrode layer is connected to the first bridge using a first via, and
  wherein the strain gauge sensors are is connected to the second bridge using a second via.

17. The flexible display of claim 16, wherein the strain gauge sensors are connected in one direction in a form of a via bridge.

18. The flexible display of claim 16, wherein the strain gauge sensors are connected in a Wheatstone bridge form.

19. The flexible display of claim 18, wherein the rollable display is a youm-on cell touch active-matrix organic light emitting diode (AMOLED) (YOCTA).

* * * * *